(12) United States Patent
Dong et al.

(10) Patent No.: US 12,548,627 B2
(45) Date of Patent: Feb. 10, 2026

(54) MEMORY DEVICES AND OPERATING METHODS THEREOF, AND MEMORY SYSTEMS

(71) Applicant: YANGTZE MEMORY TECHNOLOGIES CO., LTD., Wuhan (CN)

(72) Inventors: Zhipeng Dong, Wuhan (CN); Xufeng Zhou, Wuhan (CN); Jianjie Li, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 89 days.

(21) Appl. No.: 18/631,424

(22) Filed: Apr. 10, 2024

(65) Prior Publication Data
US 2025/0174280 A1 May 29, 2025

(30) Foreign Application Priority Data
Nov. 28, 2023 (CN) .......................... 202311614258.6

(51) Int. Cl.
*G11C 16/26* (2006.01)
*G11C 16/10* (2006.01)
*G11C 16/34* (2006.01)

(52) U.S. Cl.
CPC ............ *G11C 16/26* (2013.01); *G11C 16/102* (2013.01); *G11C 16/3404* (2013.01)

(58) Field of Classification Search
CPC .... G11C 16/26; G11C 16/102; G11C 16/3404
See application file for complete search history.

(56) References Cited

U.S. PATENT DOCUMENTS

| | | | |
|---|---|---|---|
| 9,240,245 B1* | 1/2016 | Bellorado | G11C 16/3422 |
| 10,388,390 B2* | 8/2019 | Costa | G11C 16/0483 |
| 10,902,924 B2* | 1/2021 | Park | G11C 16/349 |

* cited by examiner

*Primary Examiner* — Vanthu T Nguyen
(74) *Attorney, Agent, or Firm* — Conley Rose, P.C.

(57) ABSTRACT

A memory device includes: a memory array; the memory array includes memory cells and word lines coupled to the memory cells; and a peripheral circuit coupled to the memory array and configured to: perform a first read operation, wherein the first read operation includes: applying a first read voltage to a first word line of the word lines that belongs to the first type; and applying a first pass voltage to word lines except the first word line; perform a second read operation, wherein the second read operation includes: applying a second read voltage to a second word line of the word lines that belongs to the second type; applying a second pass voltage to word lines which are adjacent to the second word line; and applying the first pass voltage to word lines except both of the second word line and the word lines adjacent to the second word line.

20 Claims, 11 Drawing Sheets

PERFORMING A FIRST READ OPERATION, WHEREIN THE FIRST READ OPERATION INCLUDES: APPLYING A FIRST READ VOLTAGE TO A FIRST WORD LINE IN THE PLURALITY OF WORD LINES THAT BELONGS TO THE FIRST TYPE; AND APPLYING A FIRST PASS VOLTAGE TO WORD LINES IN THE PLURALITY OF WORD LINES EXCEPT THE FIRST WORD LINE

PERFORMING A SECOND READ OPERATION, WHEREIN THE SECOND READ OPERATION INCLUDES: APPLYING A SECOND READ VOLTAGE TO A SECOND WORD LINE IN THE PLURALITY OF WORD LINES THAT BELONGS TO THE SECOND TYPE; APPLYING A SECOND PASS VOLTAGE TO WORD LINES IN THE PLURALITY OF WORD LINES WHICH ARE ADJACENT TO THE SECOND WORD LINE; AND APPLYING THE FIRST PASS VOLTAGE TO WORD LINES IN THE PLURALITY OF WORD LINES EXCEPT BOTH OF THE SECOND WORD LINE AND THE WORD LINES ADJACENT TO THE SECOND WORD LINE; WHEREIN THE SECOND PASS VOLTAGE IS DETERMINED IN ACCORDANCE WITH THRESHOLD VOLTAGE DISTRIBUTIONS OF THE MEMORY CELLS COUPLED TO THE WORD LINES ADJACENT TO THE SECOND WORD LINE AFTER COMPLETION OF PROGRAMMING

PERFORMING A FIRST READ OPERATION, WHEREIN THE FIRST READ OPERATION INCLUDES: APPLYING A FIRST READ VOLTAGE TO A FIRST WORD LINE IN THE PLURALITY OF WORD LINES THAT BELONGS TO THE FIRST TYPE; AND APPLYING A FIRST PASS VOLTAGE TO WORD LINES IN THE PLURALITY OF WORD LINES EXCEPT THE FIRST WORD LINE

PERFORMING A SECOND READ OPERATION, WHEREIN THE SECOND READ OPERATION INCLUDES: APPLYING A SECOND READ VOLTAGE TO A SECOND WORD LINE IN THE PLURALITY OF WORD LINES THAT BELONGS TO THE SECOND TYPE; APPLYING A SECOND PASS VOLTAGE TO WORD LINES IN THE PLURALITY OF WORD LINES WHICH ARE ADJACENT TO THE SECOND WORD LINE; AND APPLYING THE FIRST PASS VOLTAGE TO WORD LINES IN THE PLURALITY OF WORD LINES EXCEPT BOTH OF THE SECOND WORD LINE AND THE WORD LINES ADJACENT TO THE SECOND WORD LINE; WHEREIN THE SECOND PASS VOLTAGE IS DETERMINED IN ACCORDANCE WITH THRESHOLD VOLTAGE DISTRIBUTIONS OF THE MEMORY CELLS COUPLED TO THE WORD LINES ADJACENT TO THE SECOND WORD LINE AFTER COMPLETION OF PROGRAMMING

FIG. 10

MEMORY DEVICES AND OPERATING METHODS THEREOF, AND MEMORY SYSTEMS

CROSS-REFERENCE TO RELATED APPLICATIONS

The present application claims priority to Chinese Patent Application No. 2023116142586, which was filed Nov. 28, 2023, is titled "A Memory Device, Operating Method And Memory System," and is hereby incorporated herein by reference in its entirety.

TECHNICAL FIELD

The present application relates to the field of memory technology, and in particular to a memory device, an operating method and a memory system.

BACKGROUND

With the development of storage technology, three-dimensional (3D) memory devices such as computers, tablets, etc., have been widely used. In fact, a three-dimensional (3D) memory device includes an increasing number of layers in order to increase the storage density. This design leads to increasingly serious coupling interference between layers, which seriously affects the threshold voltage distribution of the memory device during programming, and results in a reduction in the read window margin of the memory device, thereby seriously affecting the read performance of the memory device.

SUMMARY

In view of this, examples of the present application provide a memory device, an operating method and a memory system.

In order to achieve the purpose described above, a technical solution of the present application is implemented as follows:

In a first aspect, an example of the present application provides a memory device, the memory device includes a memory array; the memory array includes a plurality of memory cells and a plurality of word lines coupled to the plurality of memory cells; and
  a peripheral circuit coupled to the memory array and configured to:
  perform a first read operation, wherein the first read operation includes: applying a first read voltage to a first word line in the plurality of word lines that belongs to a first type; and applying a first pass voltage to word lines in the plurality of word lines except the first word line;
  perform a second read operation, wherein the second read operation includes: applying a second read voltage to a second word line in the plurality of word lines that belongs to a second type; applying a second pass voltage to word lines in the plurality of word lines which are adjacent to the second word line; and applying the first pass voltage to word lines in the plurality of word lines except both of the second word line and the word lines adjacent to the second word line; wherein the second pass voltage is determined in accordance with threshold voltage distributions of the memory cells coupled to the word lines adjacent to the second word line after completion of programming.

In the scheme described above, the second word line belonging to the second type is located between two first word lines belonging to the first type; and the peripheral circuit, before performing the first read operation and the second read operation, is further configured to:
  perform program operations on the plurality of memory cells in a preset programming order;
  wherein, the preset programming order includes: sequentially performing program operations on memory cells coupled to two first word lines belonging to the first type; and performing a program operation on memory cells coupled to a second word line belonging to the second type.

In the scheme described above, the program operation is incremental step pulse programming, and wherein the step size of the incremental voltage corresponding to the programming pulse applied to the first word line belonging to the first type is the same as the step size of the incremental voltage corresponding to the programming pulse applied to the second word line of the second type.

In the scheme described above, the word lines adjacent to the second word line include two first word lines belonging to the first type; and the peripheral circuit is further configured to:
  sequentially perform read operations on memory cells coupled to two first word lines belonging to the first type to obtain a first threshold voltage distribution and a second threshold voltage distribution respectively;
  obtain an adjustment voltage in accordance with the first threshold voltage distribution and the second threshold voltage distribution; and
  obtain the second pass voltage in accordance with the adjustment voltage and the first pass voltage.

In the scheme described above, the memory cells coupled to the second word line are divided into N*N groups of memory cells in accordance with the first threshold voltage distribution and the second threshold voltage distribution; the peripheral circuit is further configured to:
  determine an adjustment voltage corresponding to each group of memory cells in accordance with a preset mapping relationship, or set a corresponding adjustment voltage for each group of memory cells in accordance with a preset rule.

In the scheme described above,
  the first threshold voltage distribution includes multiple first data states; the second threshold voltage distribution includes multiple second data states; wherein, the memory cells coupled to the second word line are divided into N first sub-groups of memory cells in accordance with the multiple first data states; the memory cells coupled to the second word line are divided into N second sub-groups of memory cells in accordance with the multiple second data states;
  in the case that the N first sub-groups of memory cells include a first group and a second group, and the N second sub-groups of memory cells include a third group and a fourth group, the N*N groups of memory cells include a total of 2*2 groups of memory cells comprising a first group of memory cells, a second group of memory cells, a third group of memory cells and a fourth group of memory cells; wherein, the first group of memory cells includes the first group and the third group; the second group of memory cells includes the first group and the fourth group; the third group of memory cells includes the second group and the third group; the fourth group of memory cells includes the second group and the fourth group; and a threshold voltage in the first threshold voltage distribution corresponding to the first group is less than a threshold voltage in the first threshold voltage distribution corresponding to the second group; and a threshold voltage in the second threshold voltage distribution corresponding to the third group is less than a threshold voltage in the second threshold voltage distribution corresponding to the fourth group.

In the scheme described above, the adjustment voltage corresponding to the first group of memory cells is less than the adjustment voltage corresponding to the second group of memory cells;

the adjustment voltage corresponding to the second group of memory cells is less than or equal to the adjustment voltage corresponding to the third group of memory cells;

the adjustment voltage corresponding to the third group of memory cells is less than the adjustment voltage corresponding to the fourth group of memory cells.

In the scheme described above, the peripheral circuit is further configured to:

obtain a corresponding second pass voltage in accordance with an adjustment voltage corresponding to each group of memory cells and the first pass voltage; and perform the second read operation for multiple times, wherein in the second read operation for each time, a same second read voltage is applied to the second word line; a second pass voltage corresponding to each adjustment voltage is applied to word lines adjacent to the second word line; and a same first pass voltage is applied to other word lines.

In a second aspect, an example of the present application further provides a method of operating a memory device, wherein the memory device includes a plurality of memory cells and a plurality of word lines coupled to the plurality of memory cells; the method includes:

performing a first read operation, wherein the first read operation includes: applying a first read voltage to a first word line in the plurality of word lines that belongs to the first type; and applying a first pass voltage to word lines in the plurality of word lines except the first word line;

performing a second read operation, wherein the second read operation includes: applying a second read voltage to a second word line in the plurality of word lines that belongs to the second type; applying a second pass voltage to word lines in the plurality of word lines which are adjacent to the second word line; and applying the first pass voltage to word lines in the plurality of word lines except both of the second word line and the word lines adjacent to the second word line; wherein the second pass voltage is determined in accordance with threshold voltage distributions of the memory cells coupled to the word lines adjacent to the second word line after completion of programming.

In the scheme described above, the second word line belonging to the second type is located between two first word lines belonging to the first type; and before performing the first read operation and the second read operation, the method further includes:

performing program operations on the plurality of memory cells in a preset programming order;

wherein, the preset programming order includes: sequentially performing program operations on memory cells coupled to two first word lines belonging to the first type; and performing a program operation on memory cells coupled to a second word line belonging to the second type.

In the scheme described above, the program operation is incremental step pulse programming, and wherein the step size of the incremental voltage corresponding to the programming pulse applied to the first word line belonging to the first type is the same as the step size of the incremental voltage corresponding to the programming pulse applied to the second word line of the second type.

In the scheme described above, the word lines adjacent to the second word line include two first word lines belonging to the first type; and the method further includes:

sequentially performing read operations on memory cells coupled to two first word lines belonging to the first type to obtain a first threshold voltage distribution and a second threshold voltage distribution respectively;

obtaining an adjustment voltage in accordance with the first threshold voltage distribution and the second threshold voltage distribution; and obtaining the second pass voltage in accordance with the adjustment voltage and the first pass voltage.

In the scheme described above, the obtaining an adjustment voltage in accordance with the first threshold voltage distribution and the second threshold voltage distribution includes:

dividing memory cells coupled to the second word line into N*N groups of memory cells in accordance with the first threshold voltage distribution and the second threshold voltage distribution;

determining an adjustment voltage corresponding to each group of memory cells in accordance with a preset mapping relationship, or set a corresponding adjustment voltage for each group of memory cells in accordance with a preset rule.

In the scheme described above, the first threshold voltage distribution includes multiple first data states; the second threshold voltage distribution includes multiple second data states; wherein, the memory cells coupled to the second word line are divided into N first sub-groups of memory cells in accordance with the multiple first data states; the memory cells coupled to the second word line are divided into N second sub-groups of memory cells in accordance with the multiple second data states;

in the case that the N first sub-groups of memory cells include a first group and a second group, and the N second sub-groups of memory cells include a third group and a fourth group, the N*N groups of memory cells include a total of 2*2 groups of memory cells comprising a first group of memory cells, a second group of memory cells, a third group of memory cells and a fourth group of memory cells; wherein, the first group of memory cells includes the first group and the third group; the second group of memory cells includes the first group and the fourth group; the third group of memory cells includes the second group and the third group; the fourth group of memory cells includes the second group and the fourth group; and a threshold voltage in the first threshold voltage distribution corresponding to the first group is less than a threshold voltage in the first threshold voltage distribution corresponding to the second group; and a threshold voltage in the second threshold voltage distribution corresponding to the third group is less than a threshold voltage in the second threshold voltage distribution corresponding to the fourth group. In the scheme described above, the adjustment voltage corresponding to the first group of memory cells is less than the adjustment voltage corresponding to the second group of memory cells;

the adjustment voltage corresponding to the second group of memory cells is less than or equal to the adjustment voltage corresponding to the third group of memory cells; and the adjustment voltage corresponding to the third group of memory cells is less than the adjustment voltage corresponding to the fourth group of memory cells.

In the scheme described above, the obtaining the second pass voltage in accordance with the adjustment voltage and the first pass voltage includes: obtaining a corresponding second pass voltage in accordance with an adjustment voltage corresponding to each group of memory cells and the first pass voltage.

In the scheme described above, the method further includes: sequentially performing the second read operation for multiple times, wherein in the second read operation for each time, a same second read voltage is applied to the second word line; a second pass voltage corresponding to each adjustment voltage is applied to word lines adjacent to the second word line; and a same first pass voltage is applied to other word lines.

In the scheme described above, the method further includes:

obtaining a third threshold voltage distribution corresponding to the second read operation for each time;

obtaining a target threshold voltage distribution corresponding to the memory cells coupled to the second word line in accordance with each third threshold voltage distribution, wherein, the target threshold voltage distribution is denser than each third threshold voltage distribution.

In a third aspect, an example of the present application provides a memory system, including: the memory device of any one of the aspects described above; and a memory controller coupled to the memory device and controlling the memory device.

In the scheme described above, the memory system is included in a solid state disk SSD or a memory card.

Examples of the present application provide a memory device, an operating method and a memory system. Wherein the memory device includes: a memory array; the memory array includes a plurality of memory cells and a plurality of word lines coupled to the plurality of memory cells; and peripheral circuit coupled to the memory array and configured to: perform a first read operation, wherein the first read operation includes: applying a first read voltage to a first word line in the plurality of word lines that belongs to the first type; and applying a first pass voltage to word lines in the plurality of word lines except the first word line; perform a second read operation, wherein the second read operation includes: applying a second read voltage to a second word line in the plurality of word lines that belongs to the second type; applying a second pass voltage to word lines in the plurality of word lines which are adjacent to the second word line; and applying the first pass voltage to word lines in the plurality of word lines except both of the second word line and the word lines adjacent to the second word line; wherein the second pass voltage is determined in accordance with threshold voltage distributions of the memory cells coupled to the word lines adjacent to the second word line after completion of programming. A memory device provided by an example of the present application, in the read operation, performs a first read operation on the memory cells coupled to the first word lines belonging to the first type, and applies the first pass voltage to the remaining unselected word lines; and when performing second read operations on memory cells coupled to a first word line belonging to the second type, applies, to the word lines adjacent to the second word line, a second pass voltage that is determined in accordance with threshold voltage distributions of the memory cells coupled to the word lines adjacent to the second word line after completion of programming; and still applies the first pass voltage to the remaining unselected word lines, that is, the word lines included in the memory device are divided into two types, and when read operations are performed on memory cells coupled to different types of word lines, the pass voltages applied to the unselected word lines are different, thus, read of the memory cell coupled to the second type of word line is corrected to reduce the impact of read disturbance, so that the memory cell is able to read data correctly.

BRIEF DESCRIPTION OF THE DRAWINGS

In the accompanying drawings, which are not necessarily drawn to scale, like reference numerals may describe similar components in the different views. The same number with a different letter suffix may represent different instances of a similar component. The accompanying drawings generally illustrate, by way of example and not limitation, various examples discussed in this document.

FIG. 10 is a schematic flowchart of a method of operating a memory device provided by an example of the present application;

DETAILED DESCRIPTION

Figure 1:
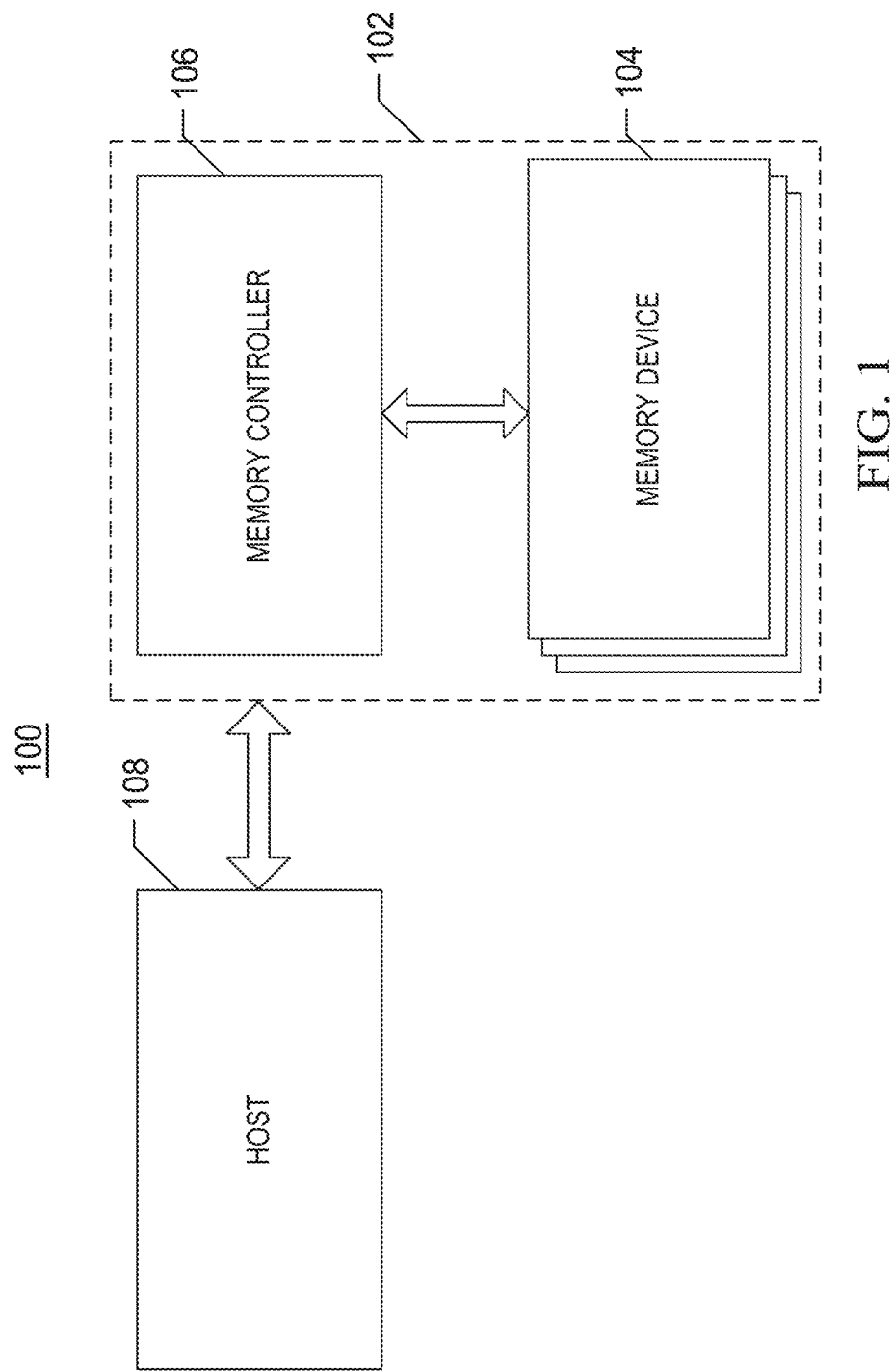
FIG. 1 is a schematic diagram of an example system with a memory system provided by an example of the present application.

Example implementations disclosed in the present application may be described in more detail below with reference to the accompanying drawings. Although example implementations of the present application are shown in the accompanying drawings, the present application may be implemented in various forms and should not be limited to the specific implementations set forth herein. Rather, these examples are provided so that the present application may be more thoroughly understood and the scope of the present application may be fully conveyed to those skilled in the art.

In the following description, numerous specific details are given in order to provide a more thorough understanding of the present application. However, it may be apparent to one skilled in the art that the present application may be practiced without one or more of these details. In other examples, in order to avoid confusion with the present application, some technical features known in the art are not described; that is, not all features of the actual example are described here, and well-known functions and structures are not described in detail.

In the accompanying drawings, size of a layer, a region, an element and their relative sizes may be exaggerated for clarity. Like reference numerals refer to like elements throughout.

It may be understood that when an element or layer is referred to as being "on," "adjacent to," "connected to", "coupled with" or "coupled to" another element or layer, it may be directly on, adjacent to, connected to or coupled to another element or layer, or intervening elements or layers may be present. In contrast, when an element is referred to as being "directly on," "directly adjacent to," "directly connected to" or "directly coupled to" another element or layer, there is no intervening elements or layers present. It may be understood that, although the terms first, second, third etc., may be used to describe various elements, components, regions, layers and/or parts, these elements, components, regions, layers and/or parts should not be limited by these terms. These terms are only used to distinguish one element, component, region, layer or part from another element, component, region, layer or part. Thus, a first element, component, region, layer or part discussed below may be termed as a second element, component, region, layer or part without departing from teachings of the present application. Whereas a second element, component, region, layer or part is discussed, it does not indicate that a first element, component, region, layer or part necessarily presents in the present application.

The spatially relative terms such as "beneath", "below", "lower", "under", "above", "on", etc., may be used herein for ease of description to describe one element or feature's relationship to another element(s) or feature(s) as illustrated in the figures. It may be understood that the spatially relative terms are intended to encompass different orientations of the device in use or operations in addition to the orientation depicted in the figures. For example, if the device in the appended drawings is turned over, an element or a feature described as "below" or "beneath" or "under" another element or feature would then be oriented "above" the another element or feature. Thus, example terms "below" and "under" may encompass both directions of up and down. A device may be otherwise oriented (rotated 90 degrees or at other orientations) and the spatially relative descriptors used herein should be interpreted accordingly.

A term used herein is for the purpose of describing a particular example only and is not to be considered as limitation of the present application. As used herein, the singular forms "a", "an" and "said/the" are intended to include the plural forms as well, unless the context clearly dictates otherwise. It should also be understood that the terms "consists of" and/or "comprising", when used in this description, identify the presence of stated features, integers, steps, operations, elements and/or parts, but do not exclude the presence or addition of one or more other features, integers, steps, operations, elements, parts and/or groups. As used herein, the term "and/or" includes any and all combinations of the associated listed items.

In order to understand the characteristics and technical content of examples of the present application in more detail, implementations of examples of the present application may be described in detail below in conjunction with the accompanying drawings, however, the accompanying drawings are for reference and description only, and are not intended to limit examples of the present application.

FIG. 1 illustrates a block diagram of an example system with a memory system provided by an example of the present application. In FIG. 1, the system 100 may be a mobile phone, a desktop computer, a laptop computer, a tablet, a vehicle computer, a gaming console, a printer, a positioning device, a wearable electronic device, a smart sensor, a Virtual Reality (VR) device, an Augmented Reality (AR) device, or any other suitable electronic devices having memory system therein. As shown in FIG. 1, the system 100 may include a host 108 and a memory system 102, where the host 108 may include a processor, e.g., a Central Processing Unit (CPU) or a System of Chip (SoC), where the SoC may be, e.g., an Application Processor (AP). The host 108 also includes at least one operating system (OS) that may generally manage and control the functions and operations performed in the host 108. The OS may enable interoperability between a host 108 coupled to the memory system 102 and users who need and use the memory system 102. The OS may support functions and operations corresponding to the request of the user, for example, without limitation, according to whether the type of the host 108 is a removable host, the OS may be classified into a general-purpose operating system and a mobile operating system, wherein the general-purpose operating system may include personal operating system and enterprise operating system, and the personal operating system may be operating systems used to support services for general purposes, including Windows and Chrome; and the enterprise operating system may be an operating system dedicated to ensuring and supporting higher performance, including Windows server, Linux, and Unix. The mobile operating system may refer to an operating system for mobility services or functions (e.g., a power saving function), and generally speaking, the mobile operating system may be an operating system such as Android, iOS, and Windows Mobile, etc. In some examples, the host 108 may include multiple OSs; accordingly, the host 108 may run multiple operating systems related to the memory system 102. In some other examples, the host 108 converts the request of the user into one or more commands, and transmits the one or more commands to the memory system 102, so that the memory system 102 performs operations associated with the one or more commands.

The memory system 102 is capable of operating or performing a specific function or performing internal various operations in response to a request from the host 108. In some examples, memory system 102 is capable of storing data accessed by host 108. Memory system 102 may act as a primary memory system or a secondary memory system for host 108. The memory system 102 and the host 108 may be electrically connected and communicate according to corresponding protocols.

Figure 2B:
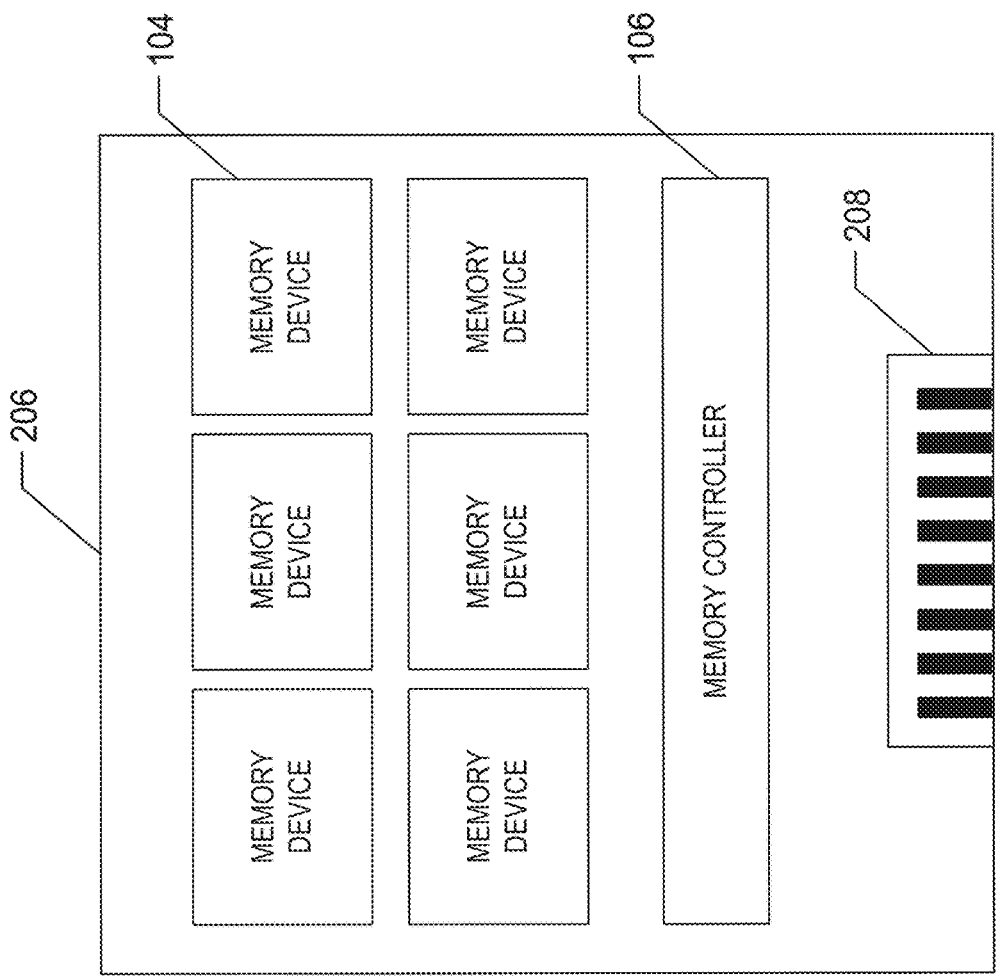
FIG. 2B is a schematic diagram of an example solid state drive with a memory system provided by an example of the present application.
Figure 2A:
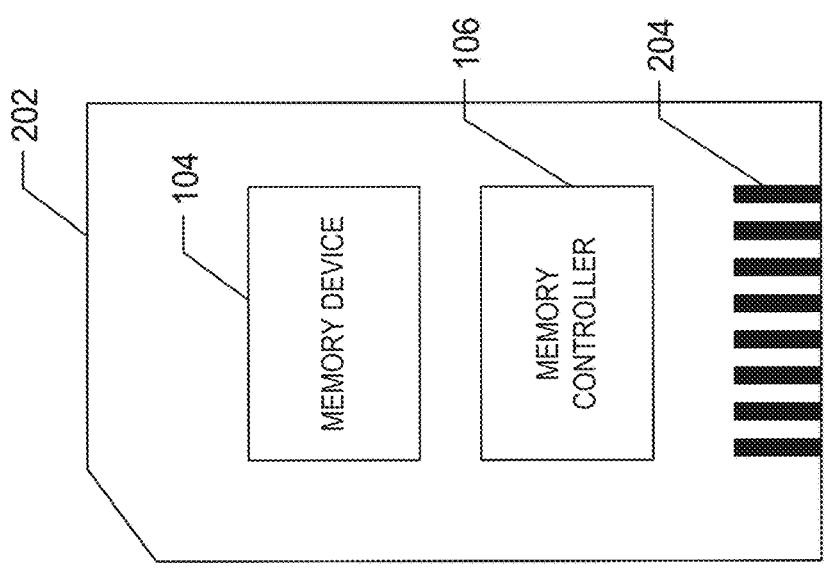
FIG. 2A is a schematic diagram of an example memory card with a memory system provided by an example of the present application.

Referring back to FIG. 1, the memory system 102 may have one or more memory devices 104 and a memory controller 106. The memory controller 106 may respond to the request of the host 108, and in turn control the memory device 104, e.g., the memory controller 106 may read data from the storage memory device 104, and transmit the read data to the host 108; it may also receive data to be stored from the host 108, and store the data to be stored into the memory device 104. That is, the memory controller 106 is capable of controlling write (or program) operation, read operation, erase operation, background operation, etc., of the memory device 104. The memory system 102 may be implemented and packaged into different types of end electronic products. Exemplarily, as shown in FIG. 2A, the memory controller 106 and a single memory device 104 may be integrated into a memory card 202. Memory card 202 may include PC Card (PCMCIA, Personal Computer Memory Card International Association), Compact Flash (CF) card, Smart Media (SM) card, Memory Stick, Secure Digital (SD) card (SD, Mini SD), Micro SD (microSD), SDHC), Universal Flash Storage (UFS) device, MultiMedia Card (MMC), Embedded MMC (eMMC), Reduced Size MMC (RSMMC), Micro MMC, Universal Serial Bus (USB) storage device and memory sticks, etc. Memory card 202 may further include a memory card connector 24 coupling memory card 202 with a host (e.g., host 108 in FIG. 1). In another example as shown in FIG. 2B, memory controller 106 and multiple memory devices 104 may be integrated into a Solid State Drive (SSD) 206. SSD 206 may further include an SSD connector 208 coupling the SSD 206 with a host (e.g., host 108 in FIG. 1). In some implementations, the storage capacity and/or operating speed of SSD 206 is greater than the storage capacity and/or operating speed of memory card 202.

In some examples, memory system 102 may also be configured as part of, e.g., a computer, Ultra Mobile PC (UMPC), workstation, netbook, Personal Digital Assistant (PDA), portable computer, web tablet, tablet computer, wireless telephone, mobile phone, smart phone, e-book, portable multimedia players (PMP), portable game console, navigation system, black box, digital camera, Digital Multimedia Broadcasting (DMB) player, three-dimensional (3D) TV, smart TV, digital audio recorder, digital audio player, digital picture recorder, digital picture player, digital video recorder, digital video player, a storage device for configuring a data center, a device capable of transmitting and receiving information in a wireless environment, one of various electronic devices for configuring a home network, one of various electronic devices for configuring a computer network, one of various electronic devices for configuring a telematics network, a Radio Frequency Identification (RFID) device, or one of various components for configuring a computing system.

Referring back to FIG. 1, memory device 104 may include a non-volatile memory that retains data stored therein even when it is not supplied with power. The memory device 104 may also include volatile storage memory. The device 104 may store data provided from the host 108 through a write operation; the memory device 104 may also provide the stored data to the host 108 through a read operation. In an example of the present application, the memory device 104 may include any memory disclosed, e.g., a volatile memory device such as dynamic random access memory (DRAM) and static RAM (SRAM), or a non-volatile memory device such as read-only memory (ROM), Mask ROM (MROM), Programmable ROM (PROM), Erasable Programmable ROM (EPROM), Electrically Erasable Programmable ROM (EEPROM), Ferroelectric RAM (FRAM), Phase Change RAM (PRAM), Magnetoresistive RAM (MRAM), Resistive RAM (RRAM or ReRAM) and Flash memory (e.g. 3D NAND Flash).

Figure 3:
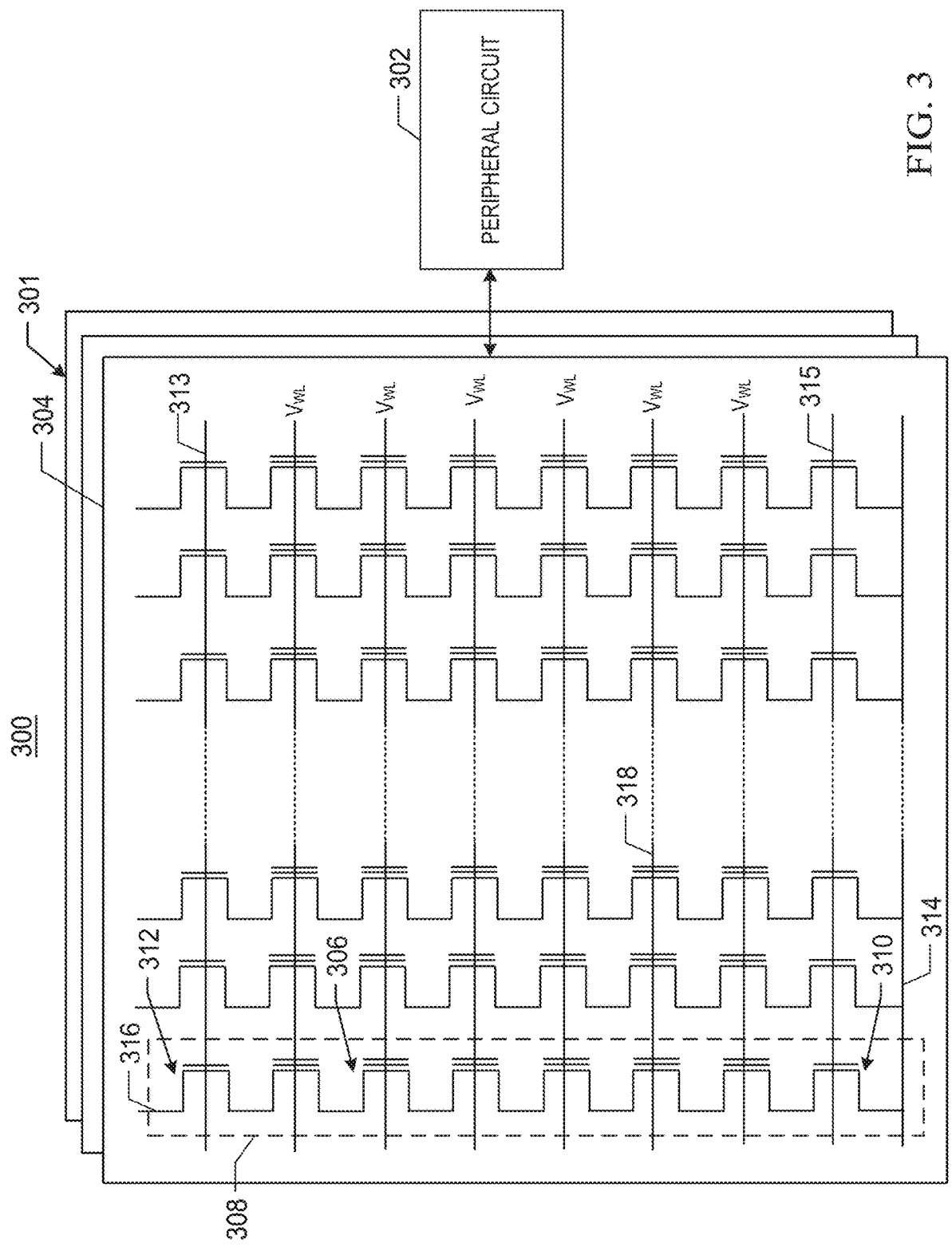
FIG. 3 is a structure schematic diagram of an example memory device including a peripheral circuit provided by an example of the present application.

FIG. 3 illustrates a schematic circuit diagram of an example memory device 300 including a peripheral circuit according to some aspects of the present application. Memory device 300 may be an example of memory device 104 in FIG. 1. The memory device 300 may include a memory array 301 and a peripheral circuit 302 coupled to the memory array 301. Taking memory array 301 being a three-dimensional NAND memory array as an example for illustration, where memory cells 306 are provided in an array of NAND memory strings 308, each NAND memory string extending vertically over a substrate (not shown). In some implementations, each NAND memory string 308 includes a plurality of memory cells 306 coupled in series and stacked vertically. Each memory cell 306 may retain a continuous analog value, e.g., voltage or charge, depending on the number of electrons trapped within the area of the memory cell 306. Each memory cell 306 may be a "floating gate" type memory cell including a floating gate transistor, or a "charge trap" type memory cell including a charge trap transistor.

In some implementations, each memory cell 306 is a Single-level Cell (SLC) that has two possible memory state (or referred to as data states) and may thus store one bit of data. For example, a first memory state of "0" may correspond to a first voltage range, and a second memory state of "1" may correspond to a second voltage range. In some implementations, each memory cell 306 is a Double-Level Cell (DLC) capable of storing more than a single bit of data in four memory states. For example, an DLC may store two bits per cell, three bits per cell (also known as a Trinary-Level Cell (TLC)), four bits per cell (also known as a Quad-Level Cell (QLC)), or five bits per cell (also known as a Penta-level cell (PLC)). Each MLC may be programmed to assume a range of possible nominal storage values. In one example, if each DLC stores two bits of data, the DLC may be programmed to assume one of three possible programming levels from the erased state through writing one of three possible nominal storage values into the cell, a fourth nominal storage value may be used for the erase state. That is to say, the multiple memory state included in the memory cell include an erase state (or erase state) or multiple programming state (or programming state), and a voltage included in the voltage range (i.e., distribution of the threshold voltage Vt) of the memory cells corresponding to the erase state is less than a voltage included in the distribution of threshold voltages of the memory cells corresponding to other programming state.

As shown in FIG. 3, each NAND memory string 308 may include a lower selection gate (BSG) 310 at its source terminal and a upper selection gate (TSG) 312 at its drain terminal. BSG 310 and TSG 312 may be configured to activate a selected NAND memory string 308 during read and program operations. In some implementations, the sources of NAND memory strings 308 in a same memory block 304 are coupled through a same source line (SL) 314 (e.g., a common SL). In other words, according to some implementations, all NAND memory strings 308 in a same memory block 304 have an array common source (ACS). According to some implementations, TSG 312 of each NAND memory string 308 is coupled to a corresponding bit line (BL) 316 from which data may be read or written via an output bus (not shown). In some implementations, each NAND memory string 308 is configured to be selected or deselected through applying a select voltage (e.g., above the threshold voltage of a transistor with a TSG 312) or a deselect voltage (e.g., 0V) to the corresponding TSG 312 via one or more TSG lines 313 and/or applying a select voltage (e.g., above the threshold voltage of a transistor with a BSG 310) or a deselect voltage (e.g., 0V) to the corresponding BSG 310 via one or more BSG lines 315.

As also shown in FIG. 3, NAND memory string 308 may be organized into a plurality of memory blocks 304 each of which may have a common source line 314 (e.g., coupled to ground). In some implementations, each memory block 304 is the basic data unit for an erase operation, i.e., all memory cells 306 on the same memory block 304 are erased simultaneously. To erase the memory cell 306 in the selected memory block 304, the source line 314 coupled to the selected memory block 304 and to the unselected memory blocks 304 in the same plane as the selected memory block 304 may be biased with an erase voltage (Vers) (e.g., a high positive voltage (e.g., 20V or higher)). In some examples, erase operations may be performed at the half-memory block level, at the quarter-memory block level, or at a level with any suitable number of memory blocks or any suitable fraction of memory blocks. Memory cells 306 of adjacent NAND memory strings 308 may be coupled through a word line 318 that selects which row of memory cells 306 is affected by read and program operations.

Figure 4:
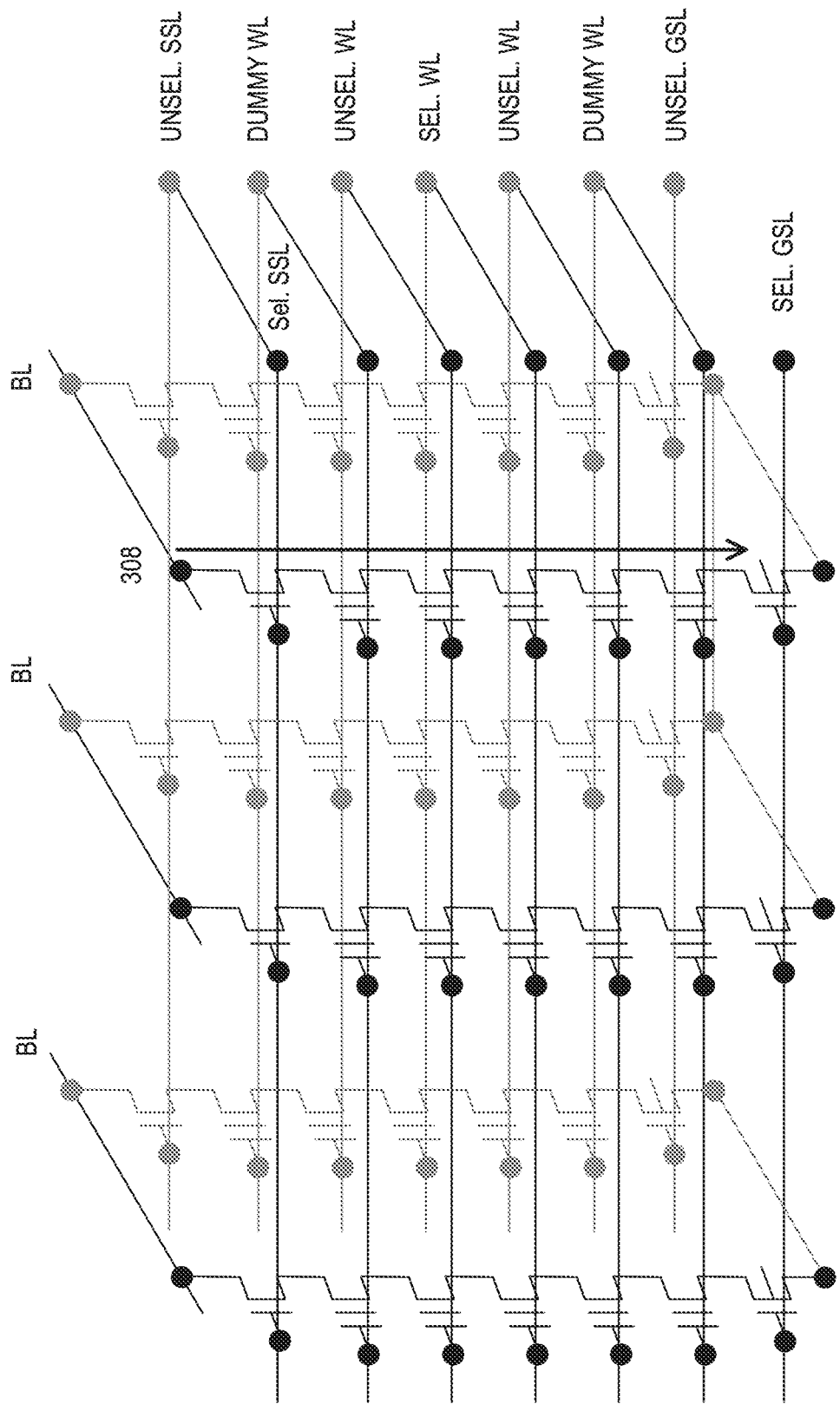
FIG. 4 is a structure schematic diagram of memory strings, word lines, and bit lines in a memory device provided by an example of the present application.

Referring to FIGS. 3 and 4, each memory cell 306 of the plurality of memory cells is coupled to a corresponding word line 318, and each memory string 308 is coupled to a corresponding bit line 316 through a corresponding select transistor (e.g., top select transistor (TSG) 312).

In one example, referring to FIG. 4, the memory device may include one or more memory strings 308 (shown with reference to the arrows in FIG. 4), each memory string may include top select transistor SST corresponding to the top select transistor gate line SSL, and a ground select transistor GST corresponding to the bottom select transistor gate line GSL, and a plurality of memory cells located between the top select transistor and the ground select transistor, each memory string is connected to a corresponding bit line BL and a unified common source line. The word line coupled to the selected memory cell is the selected word line (Sel.WL), the selected word line may be any word line among the plurality of word lines in the memory device, and other word lines are unselected wordline (Usel.WL) or dummy wordline (Dummy WL).

Figure 5:
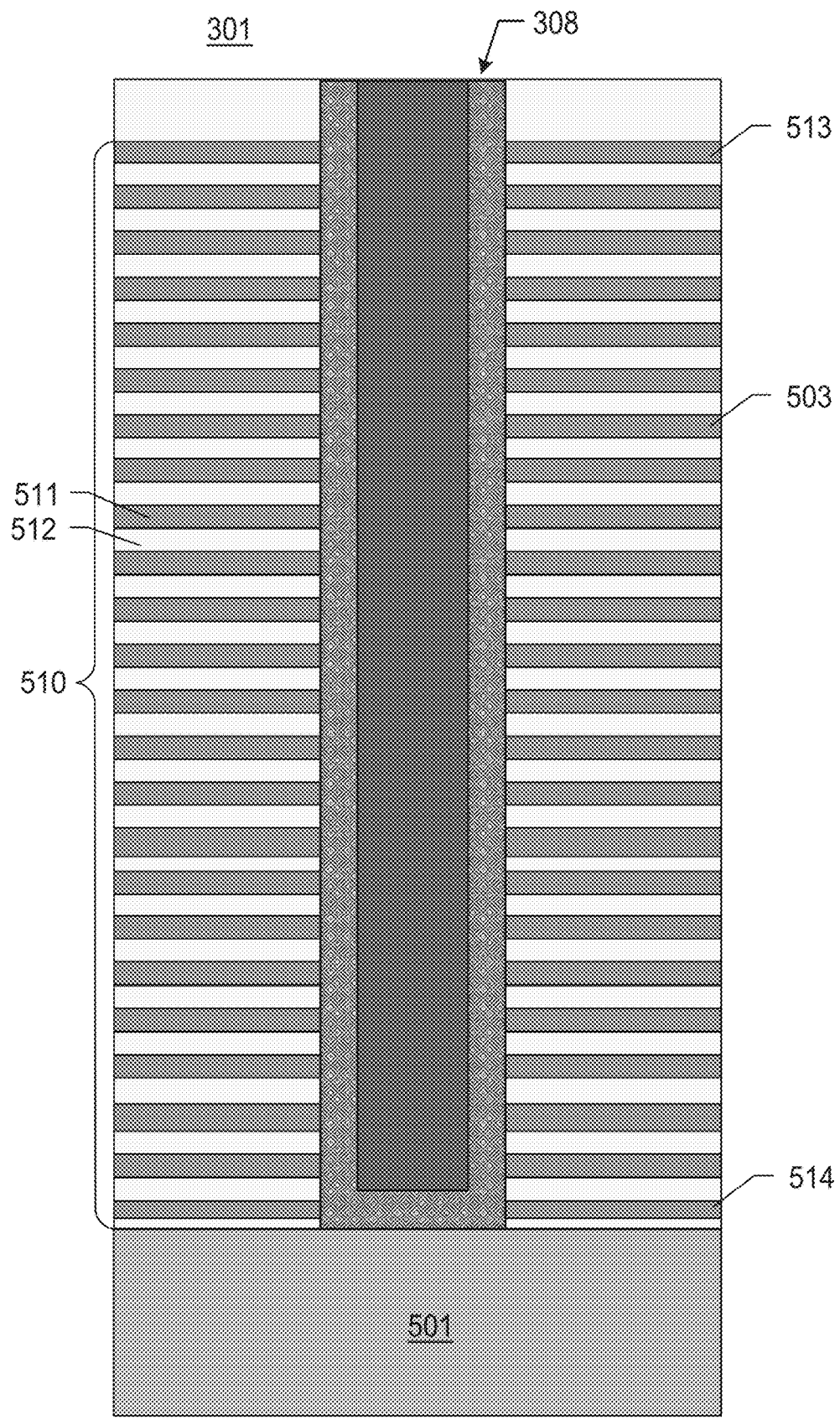
FIG. 5 is a schematic cross-sectional view of a memory array including NAND-type memory strings provided by an example of the present application.

FIG. 5 illustrates a schematic cross-sectional view of an example memory array 301 including NAND memory strings 308 according to some aspects of the present application. As shown in FIG. 5, the NAND memory string 308 may include a stacked structure 510, the stacked structure 510 includes a plurality of gate layers 511 and a plurality of insulating layers 512 alternately stacked in sequence, and memory string 308 vertically penetrating through gate layers 511 and insulating layers 512. Gate layers 511 and the insulating layers 512 may be stacked alternately, and two adjacent gate layers 511 are separated by an insulating layer 512. The number of pairs of gate layer 511 and insulating layer 512 in the stacked structure 510 may determine the number of memory cells included in the memory array 301.

A constituent material of the gate layer 511 may include a conductive material. Conductive materials include, but are not limited to, tungsten (W), cobalt (Co), copper (Cu), aluminum (Al), polysilicon, doped silicon, silicide, or any combination thereof. In some examples, each gate layer 511 includes a metal layer, e.g., a tungsten layer. In some examples, each gate layer 511 includes a doped polysilicon layer. Each gate layer 511 may include a control gate surrounding a memory cell. A gate layer 511 at the top of a stacked structure 510 may extend laterally as an upper selection gate line 513, a gate layer 511 at the bottom of a stacked structure 510 may extend laterally as a lower selection gate line 514, and a gate layer 511 extending laterally between a upper selection gate line and a lower selection gate line may serve as a word line layer 503.

In some examples, a stacked structure 510 may be disposed on a substrate 501. The substrate 501 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some examples, NAND memory string 308 includes a channel structure extending vertically through stacked structure 510. In some implementations, a channel structure includes a channel hole filled with semiconductor material(s) (e.g., as a semiconductor channel) and dielectric material(s) (e.g., as a memory film). In some implementations, a semiconductor channel includes silicon, e.g., polysilicon. In some implementations, a memory film is a composite dielectric layer including a tunneling layer, a storage layer (also referred to as a "charge trapping/storage layer"), and a blocking layer. A channel structure may have a cylindrical shape (e.g., a pillar shape). According to some implementations, a semiconductor channel, a tunneling layer, a storage layer and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A barrier layer may include silicon oxide, silicon oxynitride, a high-k dielectric, or any combination thereof. In an example, a memory film may include a composite layer of silicon oxide/silicon oxynitride/silicon oxide (ONO).

Figure 6:
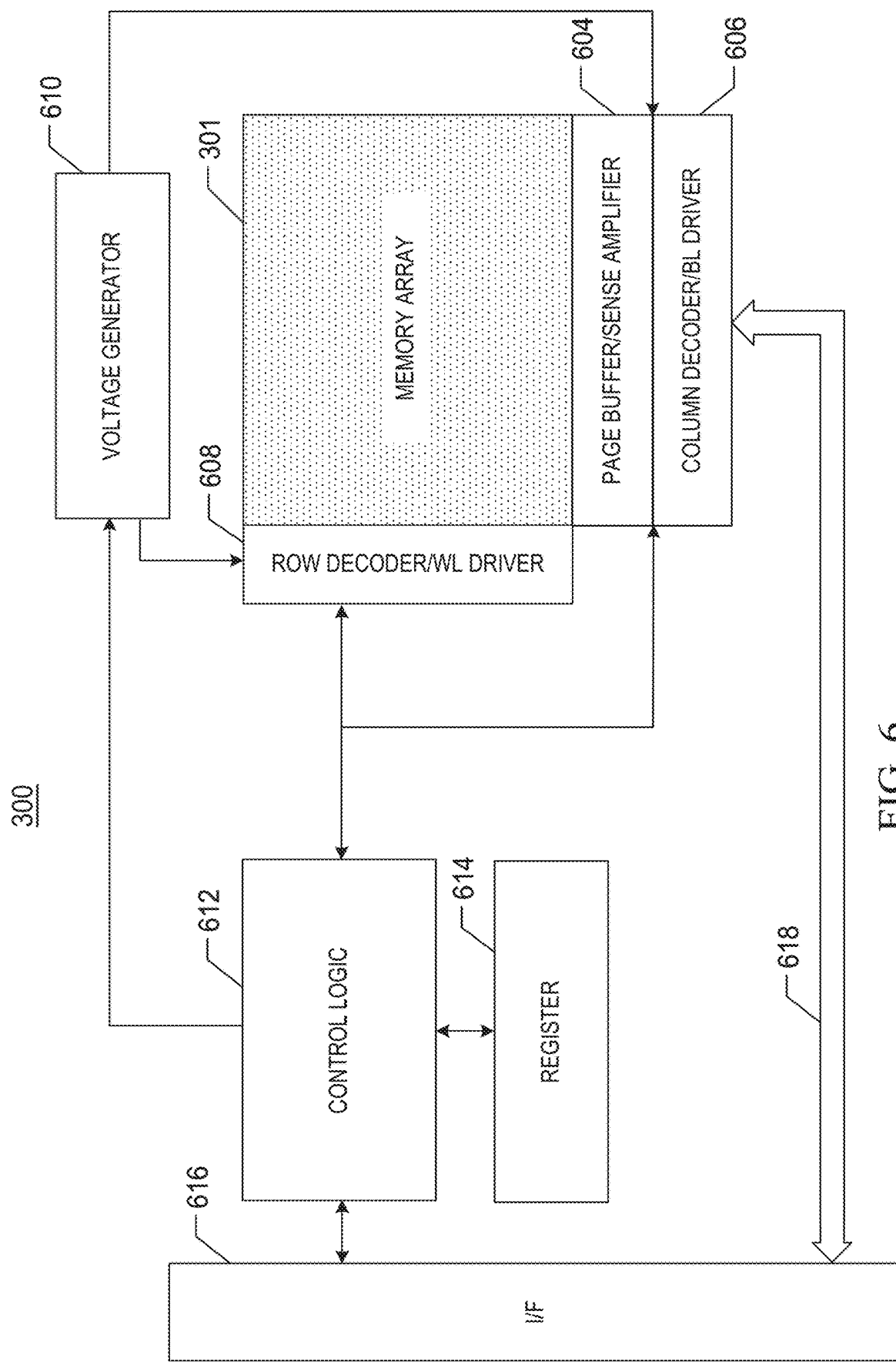
FIG. 6 is a schematic diagram of an example memory device including a memory array and peripheral circuits provided by an example of the present application.

Referring back to FIG. 3, the peripheral circuit 302 may be coupled to the memory array 301 through the bit line 316, word line 318, source line 314, BSG line 315, and TSG line 313. A peripheral circuit 302 may include any suitable analog, digital, and mixed-signal circuitry for facilitating operation of the memory array 301 through applying a voltage signal and/or a current signal to and sensing voltage signal and/or current signal from each target memory cell 306 via bit line 316, word line 318, source line 314, BSG line 315, and TSG line 313. The peripheral circuit 302 may include various types of peripheral circuits formed with metal-oxide-semiconductor (MOS) technology. For example, FIG. 6 illustrates some example peripheral circuits, a peripheral circuit 302 includes page buffer/sense amplifier 604, column decoder/bit line driver 606, row decoder/word line driver 608, voltage generator 610, control logic 612, register 614, interface 616 and data bus 618. In some examples, additional peripheral circuits not shown in FIG. 6 may also be included.

The page buffer/sense amplifier 604 may be configured to read data from and program (write) data to the memory array 301 according to control signals from the control logic 612. In one example, the page buffer/sense amplifier 604 may store a page of programming data (written data) to be programmed into the memory array 301. In another example, page buffer/sense amplifier 604 may perform a programming verify operation to ensure that data has been correctly programmed into memory cell 306 coupled to selected word line 318. In yet another example, page buffer/sense amplifier 604 may also sense a low power signal from bit line 316 representing a data bit stored in memory cell 306 and amplify a small voltage swing to a recognizable logic level during a read operation. The column decoder/bit line driver 606 may be configured to be controlled by control logic 612 and to select one or more NAND memory strings 308 through applying a bit line voltage generated from voltage generator 610.

The row decoder/word line driver 608 may be configured to be controlled by control logic 612 and select/deselect memory block 304 of memory array 301 and select/deselect word line 318 of memory block 304. The row decoder/word line driver 608 may also be configured to drive word line 318 with a word line voltage generated from voltage generator 610. In some implementations, the row decoder/word line driver 608 may also select/deselect and drive the BSG line 315 and the TSG line 313. The row decoder/word line driver 608 may be configured to perform program operations on the memory cells 306 coupled to the selected word line 318. The voltage generator 610 may be configured to be controlled by the control logic 612, and generate word line voltage (e.g., read voltage, programming voltage, pass voltage, channel boost voltage, verify voltage, etc.), bit line voltage and source line voltage to be supplied to the memory array 301.

The control logic 612 may be coupled to each of the peripheral circuits described above and configured to control operations of each of the peripheral circuits. The register 614 may be coupled to the control logic 612 and include state register, command register and address register for storing state information, command operation code (OP code) and command address for controlling operations of each of the peripheral circuits. The interface 616 may be coupled to control logic 612 and act as a control buffer to buffer and relay control commands received from a host (not shown) to control logic 612 and to buffer and relay state information received from the control logic 612 to the host. Interface 616 may also be coupled to column decoder/bit line driver 606 via data bus 618 and act as a data I/O interface and data buffer to buffer and relay data to/from memory array 301.

For the memory system and memory described above, Read Window Margin (RWM) is an important parameter for reading data on a memory cell correctly. In some examples, the RWM of a memory cell configured to correspond to multiple data states includes multiple readable distributions, and the sum of these multiple readable distributions may be referred to as an Edge summary (Esum), where each readable distribution Ei may be a voltage interval that may be used to read data in a memory cell in a certain data state. Where i is an integer greater than or equal to 0.

Figure 7:
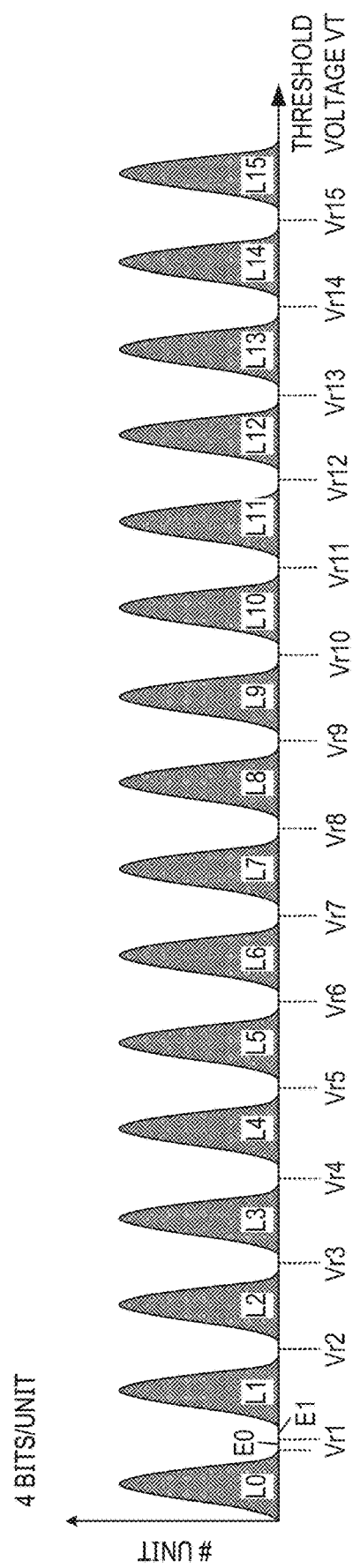
FIG. 7 is a schematic diagram of threshold voltage distribution and Esum of QLC type memory cells provided by an example of the present application.

For example, as shown in FIG. 7, a schematic diagram of Esum in a QLC type memory cell is shown. In FIG. 7, for a QLC type memory cell, all of readable distributions may include a total of 30 readable distributions: E0, E1, ..., E29, which may be denoted as: Esum=E0+E1+ . . . +E29. Wherein E0 is the first readable distribution, which is the voltage interval between the lower tail of the threshold voltage distribution corresponding to the data state P0 and the voltage Vr1 (read voltage), which is a voltage range that may be used to read data on the memory cell in an erase state. E1 is the second readable distribution, which is a voltage range that may be used to read the voltage area of data on the memory cell in the P1 state, it is the voltage interval between the minimum voltage of the threshold voltage distribution corresponding to the data state P0 and the voltage Vr1 (read voltage). For the understanding of other readable distributions, the analogy follows.

In actual applications, when a read operation is performed on a memory device, the RWM with a sufficient width (i.e., Esum) is required to read the data on the memory cell correctly. There are many factors that could affect RWM, among which, as the number of layers of a memory device gradually increases, the distance between layers (i.e., between word lines) decreases, causing coupling between word lines to impact on RWM seriously.

In order to solve one or more of the technical problems described above, an example of the present application provides a memory device that applies different read strategies for memory cells coupled to different types of word lines during a read operation. In one example, when a memory cell coupled to the first word line of the first type is read, a first read voltage is applied to the first word line; a first pass voltage is applied to other word lines; and when memory cells coupled to the second word line of the second type is read, a second read voltage is applied to the second word line, a second pass voltage is applied to the word lines adjacent to the second word line, the second pass voltage is determined in accordance with threshold voltage distributions of the memory cells coupled to the word lines adjacent to the second word line after completion of programming; and the first pass voltage is applied to remaining word lines, that is, the reading of the memory cell coupled to the second type of word line is corrected to reduce the impact of read disturbance, so that the memory cell is able to read data correctly.

Figure 8:
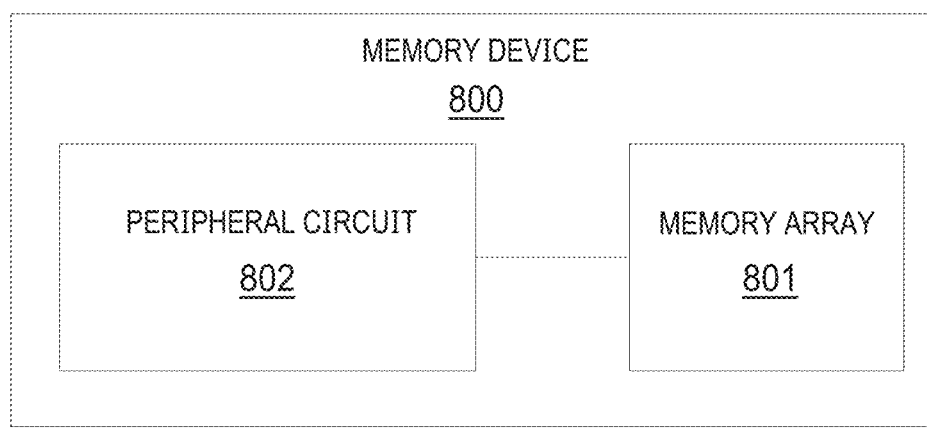
FIG. 8 is a structure schematic diagram of a memory device provided by an example of the present application.

In one example, as shown in FIG. 8, an example of the present application provides a memory device 800, including:

a memory array 801; the memory array includes a plurality of memory cells and a plurality of word lines coupled to the plurality of memory cells; and a peripheral circuit 802 coupled to the memory array 801 and configured to:

perform a first read operation, wherein the first read operation includes: applying a first read voltage to a first word line in the plurality of word lines that belongs to the first type; and applying a first pass voltage to word lines in the plurality of word lines except the first word line;

perform a second read operation, wherein the second read operation includes: applying a second read voltage to a second word line in the plurality of word lines that belongs to the second type; apply a second pass voltage to word lines in the plurality of word lines which are adjacent to the second word line; and applying the first pass voltage to word lines in the plurality of word lines except both of the second word line and the word lines adjacent to the second word line; wherein the second pass voltage is determined in accordance with threshold voltage distributions of the memory cells coupled to the word lines adjacent to the second word line after completion of programming.

The memory device 800 includes a memory array 801 and a peripheral circuit 802, wherein the memory array 801 may refer to the structure described in FIG. 3 and FIG. 4. The peripheral circuit 802 may include circuit as described in FIG. 6. The connection relationship between the plurality of memory cells and the plurality of word lines coupled to the plurality of memory cells may refer to the description of FIG. 3 and FIG. 4. An example of the present application takes the memory device 800 being a 3D NAND flash memory as an example for description, i.e., unless otherwise specified below, the discussed memory device is a 3D NAND flash memory.

Based on the foregoing description, the read scheme applied by the example of the present application for the memory device includes:

applying a first read voltage to the first word line of the first type, and applying a first pass voltage to word lines except the first word line to perform a first read operation on memory cells coupled to the first word line of the first type;

applying a second read voltage to the second word line of the second type; applying, to the word lines adjacent to the second word line, a second pass voltage that is determined in accordance with threshold voltages of the memory cells coupled to the word lines adjacent to the second word line after completion of programming; and applying a first pass voltage to word lines except both of the second line and the word lines adjacent to the second line to perform a second read operation on memory cells coupled to the second word line of the second type.

That is, when a read operation is performed on a memory device, a plurality of word lines are divided into two types, and when read operations are performed on memory cells coupled to different types of word lines, the pass voltages applied to unselected word lines are different. In one example, when a first read operation is performed on memory cells coupled to the first word line of the first type, a first read voltage is applied to the first word line; a first pass voltage is applied to other word lines (word lines except the first word line) in the plurality of word lines; and when a second read operation is performed on memory cells coupled to the second word line of the second type, a second read voltage is applied to the second word line; a second pass voltage is applied to the word lines adjacent to the second word line, the second pass voltage is determined in accordance with threshold voltage distributions of the memory cells coupled to the word lines adjacent to the second word line after completion of programming; a first pass voltage is applied to other word lines (word lines except the second word line and the word lines adjacent to the second word line) in the plurality of word lines.

Here, the description of the first type and the second type is only to distinguish different types of word lines in the plurality of word lines, and does not limit the number or order. The description of the first read voltage and the second read voltage is only to distinguish the read voltages applied to the selected word line in the first read operation and the second read operation (e.g., the first word line corresponds to the first read operation, the second word line corresponds to the second read operation), but not a limit on the quantity. Similarly, the first pass voltage and the second pass voltage may also be understood as described above.

Moreover, according to the following description, the second pass voltage is obtained through the first pass voltage plus an adjustment voltage determined in accordance with the threshold voltage distribution of the memory cells coupled to the word lines adjacent to the second word line after completion of programming. That is, a same first pass voltage is applied to the unselected word lines during the first read operation; while the first pass voltage and the second pass voltage are applied to the unselected word lines during the second read operation (the second pass voltage is applied to the word lines adjacent to the selected second word line), and the second pass voltage is adjusted on the basis of the first pass voltage, in fact, that is, the first read operation is a normal read operation, and the second read operation is a read operation modified through a pass voltage. Thus, the read operations only performed on some of the memory cells coupled to the word lines are to be corrected, which may not only save time, but also obtain a denser threshold voltage distribution.

In 3D NAND flash memory, as the number of layers increases, coupling interference between word lines is inevitable and is one of the main reasons affecting the threshold voltage distribution of memory cells. Furthermore, when the multiple memory cells described above are programmed in a positive order (programming in the direction from the source line to the bit line of the memory string) or in reverse order (programming in the direction from the bit line to the source line of the memory string), the word line corresponding to the programmed memory cell may cause coupling interference to the word line corresponding to the unprogrammed memory cell, which in turn may cause the threshold voltage distribution of the memory cell to be broadened during reading, thereby reducing the RWM. In the programming case described above, in order to ensure sufficient RWM, it is required to correct the read operations on memory cells coupled to each word line to obtain correct read data. The correction takes a lot of time, increases read time, and seriously affects read and write performance of the memory device. Based on this, an example of the present application applies programming in way of looping, where during programming, only the second word line of the second type is subject to coupling interference from adjacent word lines, and the first word line of the first type is not subject to coupling interference from adjacent word lines. Therefore, when a read operation is performed, it is only required to adjust the pass voltage of the memory cells coupled to the second word line of the second type that is subject to coupling interference. One implementation is as described above, i.e., when a read operation is performed to memory cells coupled to the second word line (i.e., the second read operation is performed), its pass voltage is adjusted. After the adjustment, the threshold voltage distribution of the memory cells coupled to the second word line is denser, which means that the threshold voltage distribution of the memory cells coupled to the second word line has a wider RWM.

In one example, reference may be made to the following description for an understanding of the loop programming previously described: the second word line belonging to the second type is located between two first word lines belonging to the first type; and the peripheral circuit, before
  performing the first read operation and the second read operation, may be further configured to: perform program operations on the plurality of memory cells in a preset programming order;
  wherein, the preset programming order includes: sequentially performing program operations on memory cells coupled to two first word lines belonging to the first type; and performing a program operation on memory cells coupled to a second word line belonging to the second type.

Here, the described preset programming order may be, for the memory cells on the memory string 308 in the memory array as shown in FIGS. 3 and 4, performing a loop programming in the order from the memory cell close to the source line SL to the memory cell close to the bit line BL, or performing a loop programming in the order from the memory cell close to the bit line BL to the memory cell close to the source line SL. In one example, the preset programming order includes: sequentially performing program operations on memory cells coupled to two first word lines belonging to the first type firstly; and then performing a program operation on memory cells coupled to a second word line belonging to the second type. The second word line belonging to the second type is located between two first word lines belonging to the first type. According to the programming in way of looping and based on the previous description, the word line corresponding to the memory cell to be programmed later may be subject to coupling interference of the word line corresponding to the memory cell to be programmed early, which may affect the broadening of threshold voltage distribution of the word line, causing the loss of Esum of the threshold voltage distribution, however, in the programming in way of looping provided by the example of the present application, only the second word line belonging to the second type is subject to coupling interference caused by the programming of two first word lines belonging to the first type, and the two first word lines belonging to the first type are not subject to coupling interference between word lines.

Based on this, the word lines included in the memory device programmed according to this programming in way of looping are divided into two types, i.e., the first word line of the first type and the second word line of the second type. Furthermore, during the read operation, only the read of the memory cells coupled to the second word line belonging to the second type is corrected, and the memory cells coupled to the first word line belonging to the first type are read normally.

The preset programming order described in the example of the present application is described according to the programming results, and the order for the memory cells coupled to two first word lines belonging to the first type completing programming is earlier than the order for the memory cells coupled to the second word line belonging to the second type completing programming. In other words, the memory cells coupled to two first word lines belonging to the first type are programmed firstly, and the memory cells coupled to the second word line belonging to the second type are programmed later, however, during the programming process, the programming of memory cells coupled to two first word lines belonging to the first type is not strictly adjacent to the programming of a memory cell coupled to a second word line belonging to the second type.

Figure 9:
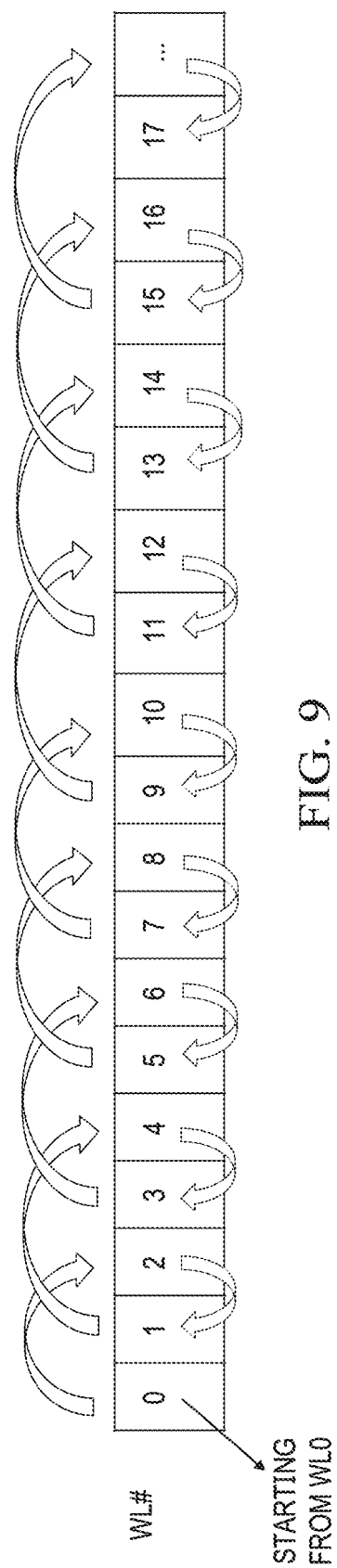
FIG. 9 is a schematic diagram of programming in way of looping provided by an example of the present application.

In one example, as shown in FIG. 9, FIG. 9 shows a schematic diagram of loop programming provided by an example of the present application. In FIG. 9, each square represents a word line WL, and the numbers of the word lines WL are 0, 1, 2, 3, 4, 5, 6, 7, 8, 9, . . . , 17, . . . . Assuming that the programming starts from word line WL0, the preset programming order may be: 0-2-1-4-3-6 and so on. Wherein if two first word lines belonging to the first type are WL0 and WL2 respectively, and the second word line belonging to the second type is WL1, at this point, programming of the three are adjacent. When two first word lines belonging to the first type are WL2 and WL4 respectively, and the second word line belonging to the second type is WL3, at this point, programming of the three are not adjacent. Instead, after the memory cells coupled to the word line WL2 belonging to the first type are programmed, the second word line WL1 belonging to the second type is programmed, after that, the memory cells coupled to the first word line WL4 belonging to the first type are programmed, and finally the memory cells coupled to the second word line WL3 belonging to the second type are programmed. Based on this loop programming, the word lines WL1, WL3, WL5, . . . , etc., are subject to the coupling interference of the adjacent word lines on both sides, while the word lines WL0, WL2, WL4, . . . , etc., are not subject to the coupling interference of the adjacent word lines. In some examples, as shown in FIG. 9, the word lines numbered 0, 2, 4, 6, . . . may be referred to as odd word lines; the word lines numbered 1, 3, 5, . . . may be referred to as even word lines.

In the actual application process, no matter what programming order is used, as long as a first type of first word line that is not subject to coupling interference and a second type of second word line that is subject to coupling interference from adjacent word lines are finally formed. For example, under the word line structure shown in FIG. 9, programming may also be started from the word line with a larger number and in the order described in FIG. 9 described above; as another example, under the word line structure shown in FIG. 9, programming may also be started from the word line numbered 1, and the order may include 1-0-3-2-5-4 and so on, in this programming order, word line WL0 has only one adjacent word line, and it is subject to coupling interference from only one adjacent word line, that is to say, in this programming order, an edge word line has only one adjacent word line, and it may be subject to coupling interference from only one word line and may be processed separately during read correction, while remaining word lines subject to coupling interference may still be subject to coupling interference from two adjacent word lines. The encoding of the word line described above does not limit its position in the memory string 308. In other words, in the word line shown in FIG. 9, word line WL0 may be a word line close to the bit line in the memory string, i.e., programming starts from the memory cell close to the bit line; word line WL0 may also be a word line close to the source line in the memory string, i.e., programming starts from the memory cell close to the source line. Regardless of in which direction the programming starts, the programming logic is the same as the programming in way of looping described above.

In some examples, the program operation is incremental step pulse programming, and wherein the step size of the incremental voltage corresponding to the programming pulse applied to the first word line belonging to the first type is the same as the step size of the incremental voltage corresponding to the programming pulse applied to the second word line of the second type.

Here, for programming multiple memory cells, Incremental Step Pulse Programming (ISPP) may be applied for programming in way of looping. Moreover, when the example of the present application applies the programming in way of looping as described above, the step increments of the programming voltages corresponding to the odd word line and the even word line may be the same or different. The example of the present application applying the ISPP method in which the step increments of the programming voltages corresponding to the odd word line and the even word line are the same for programming is used to illustrate the inventive concept of the present application.

As described above, due to the programming in way of looping provided by the example of the present application, the read method of the memory device includes two types of read, i.e., the first read operation and the second read operation. In this read method, the first read operation may be considered as a conventional read operation, or in other words, a read operation that does not require correction, correct read data may be obtained by using the given first pass voltage and a first read voltage; the second read operation may be considered as a corrective read scheme, or in other words, a read operation that is to be corrected, and the second pass voltage is required, and correct read data is required to be obtained with the first pass voltage, the second pass voltage and the second read voltage. Thus, the threshold voltage distribution of the memory cells which are read may be denser, and the corresponding Esum includes a larger readable distribution.

Before the second read operation is performed, in some examples, the word lines adjacent to the second word line include two first word lines belonging to the first type; and the peripheral circuit is further configured to:

sequentially perform read operations on memory cells coupled to two first word lines belonging to the first type to obtain a first threshold voltage distribution and a second threshold voltage distribution respectively;

obtain an adjustment voltage in accordance with the first threshold voltage distribution and the second threshold voltage distribution;

obtain the second pass voltage in accordance with the adjustment voltage and the first pass voltage.

What is described here is the operation of determining the second pass voltage. In one example, read operations are sequentially performed on memory cells coupled to two first word lines belonging to the first type which are adjacent to the second word line to obtain a first threshold voltage distribution and a second threshold voltage distribution respectively; an adjustment voltage relative to the first pass voltage is then obtained in accordance with the first threshold voltage distribution and the second threshold voltage distribution; and then the second pass voltage is obtained in accordance with the adjustment voltage and the first pass voltage. That is, the adjustment amount is obtained in accordance with the first threshold voltage distribution and the second threshold voltage distribution, and on the basis of the first pass voltage, an adjustment is performed according to the adjustment amount to obtain the second pass voltage.

The memory cells coupled to the second word line are divided into N*N groups of memory cells in accordance with the first threshold voltage distribution and the second threshold voltage distribution; the peripheral circuit may be further configured to:

determine an adjustment voltage corresponding to each group of memory cells in accordance with a preset mapping relationship, or set a corresponding adjustment voltage for each group of memory cells in accordance with a preset rule.

Here, the first threshold voltage distribution includes multiple first data states; the second threshold voltage distribution includes multiple second data states; wherein, the memory cells coupled to the second word line are divided into N first sub-groups of memory cells in accordance with the multiple first data states; the memory cells coupled to the second word line are divided into N second sub-groups of memory cells in accordance with the multiple second data states;

in the case that the N first sub-groups of memory cells include a first group and a second group, and the N second sub-groups of memory cells include a third group and a fourth group, the N*N groups of memory cells include a total of 2*2 groups of memory cells comprising a first group of memory cells, a second group of memory cells, a third group of memory cells and a fourth group of memory cells; wherein, the first group of memory cells includes the first group and the third group; the second group of memory cells includes the first group and the fourth group; the third group of memory cells includes the second group and the third group; the fourth group of memory cells includes the second group and the fourth group; and the threshold voltage in the first threshold voltage distribution corresponding to the first group is less than the threshold voltage in the first threshold voltage distribution corresponding to the second group; and the threshold voltage in the second threshold voltage distribution corresponding to the third group is less than the threshold voltage in the second threshold voltage distribution corresponding to the fourth group.

The referred multiple first data states and the multiple second data states are only descriptions to distinguish the data states respectively corresponding to the first threshold voltage distribution and the second threshold voltage distribution. In an actual application process, the number of the multiple first data states is the same as the number of the multiple second data states, e.g., the multiple first data states include 8 data states; at this point, the multiple second data states include 8 data states. For another example, the multiple first data states include 16 data states; at this point, the multiple second data states include 16 data states.

In an actual application process, the memory cells coupled to the second word line are divided into N*N groups of memory cells in accordance with multiple first data states and multiple second data states. In one example, the memory cells coupled to the second word line are divided into N first sub-groups of memory cells in accordance with the multiple first data states; and the memory cells coupled to the second word line are divided into N second sub-groups of memory cells in accordance with the multiple second data states. In this case, N*N groups of memory cells are formed in accordance with combining N first sub-groups of memory cells and N second sub-groups of memory cells.

After N*N groups of memory cells are obtained, various forms may be applied to obtain the corresponding adjustment voltage for each group of memory cells. An optional implementation may be as follows: a preset mapping relationship is pre-stored, which may include a correspondence between a group of memory cells and an adjustment voltage; subsequently, after the first threshold voltage distribution (corresponding to the multiple first data states) and the second threshold voltage distribution (corresponding to the multiple second data states) are obtained, the memory cells coupled to the second word line are divided into N first sub-groups of memory cells in accordance with the multiple first data states; the memory cells coupled to the second word line are divided into N second sub-groups of memory cells in accordance with the multiple second data states; and N*N groups of memory cells are formed in accordance with the N first sub-groups of memory cells and the N second sub-groups of memory cells; then, an adjustment voltage corresponding to each group of memory cells is determined in accordance with the preset mapping relationship. In this implementation, that is, the relationship between the group of memory cells and the adjustment voltage is known in advance, and then, in accordance with the obtained first threshold voltage distribution and second threshold voltage distribution, the memory cells coupled to the second word line are divided into N*N as pre-planned, then an adjustment voltage corresponding to each group of memory cells is obtained in accordance with the mapping relationship.

Another optional implementation could be as follows: after the first threshold voltage distribution and the second threshold voltage distribution are obtained, the memory cells coupled to the second word line are divided into several groups in real time in accordance with the multiple first data states; and the memory cells coupled to the second word line are divided into the same number of groups in real time in accordance with the multiple second data states. Finally, N*N groups of memory cells are formed. After that, a value is assigned to each group of memory cells according to preset rules. In this method, there is no need to store a mapping relationship, and a value is assigned to the adjustment voltage in real time. The preset rule may be set according to the following principle: the larger N is, the denser the threshold voltage distribution of the memory cells coupled to the second word line is, the threshold voltage distribution is obtained by performing a read operation. Further the greater the threshold voltage corresponding to the N first sub-groups of memory cells included in each of the N*N groups of memory cells is, the greater the corresponding adjustment voltage is; and the greater the threshold voltage corresponding to the N second sub-groups of memory cells included in each of the N*N groups of memory cells is, the greater the corresponding adjustment voltage is. In this case, the adjustment voltages corresponding to several groups of memory cells among the N*N groups of memory cells that include data states with intermediate threshold voltages may be equal.

For example, in some examples, the N first sub-groups of memory cells may include a first group and a second group, the N second sub-groups of memory cells may include a third group and a fourth group, the N*N groups of memory cells may include 2*2 groups of memory cells, and the 2*2 groups of memory cells include a first group of memory cells, a second group of memory cells, a third group of memory cells and a fourth group of memory cells;

wherein, the first group of memory cells includes the first group and the third group; the second group of memory cells includes the first group and the fourth group; the third group of memory cells includes the second group and the third group; the fourth group of memory cells includes the second group and the fourth group; and the threshold voltage in the first threshold voltage distribution corresponding to the first group is less than the threshold voltage in the first threshold voltage distribution corresponding to the second group; and the threshold voltage in the second threshold voltage distribution corresponding to the third group is less than the threshold voltage in the second threshold voltage distribution corresponding to the fourth group.

Here, the memory cells coupled to the second word line are divided into two first sub-groups of memory cells according to the multiple first data states, namely the first group and the second group, and a threshold voltage in the first threshold voltage distribution corresponding to the first group is less than a threshold voltage in the first threshold voltage distribution corresponding to the second group. Here, the memory cells coupled to the second word line are divided into two second sub-groups of memory cells according to multiple second data states, namely the third group and the fourth group, and a threshold voltage in the second threshold voltage distribution corresponding to the third group is less than a threshold voltage in the second threshold voltage distribution corresponding to the fourth group. Therefore, the 2*2 groups of memory cells formed in accordance with the 2 first sub-groups of memory cells and the 2 second sub-groups of memory cells includes a total of 4 groups of memory cells: the first group of memory cells, the second group of memory cells, the third group of memory cells and the fourth group of memory cells. Furthermore, the first group of memory cells includes the first group and the third group; the second group of memory cells includes the first group and the fourth group; the third group of memory cells includes the second group and the third group; the fourth group of memory cells includes the second group and the fourth group.

For example, it is assumed that the first threshold voltage distribution includes eight first data states: L0, L1, L2, L3, L4, L5, L6, and L7, respectively, and their threshold voltages increase sequentially; the second threshold voltage distribution includes eight second data states, which are L0, L1, L2, L3, L4, L5, L6, and L7, respectively, and their threshold voltages increase sequentially. Therefore, the first sub-group of memory cells may include two, e.g., L0, L1, L2, L3, and L4 belong to one first sub-group of memory cells, i.e., the first group; L5, L6, and L7 belong to another first sub-group of memory cells, i.e., the second group. In the same way, the second sub-group of memory cells also includes two, e.g., L0, L1, L2, L3, and L4 belong to one second sub-group of memory cells, i.e., the third group; L5, L6, and L7 belong to another second sub-group of memory cells, i.e., the fourth group. Based on this, the first group of memory cells includes the first group and the third group, i.e., including the first sub-group of memory cells in L0, L1, L2, L3 and L4 and the second sub-group of memory cells in L0, L1, L2, L3 and L4; the second group of memory cells includes the first group and the fourth group, i.e., including the first sub-group of memory cells in L0, L1, L2, L3, and L4 and the second sub-group of memory cells in L5, L6, and L7; the third group of memory cells includes the second group and the third group, i.e., including the first sub-group of memory cells in L5, L6, and L7 and the second sub-group of memory cells in L0, L1, L2, L3, and L4; the fourth group of memory cells includes the second group and the fourth group, i.e., including the first sub-group of memory cells in L5, L6, and L7 and the second sub-group of memory cells in L5, L6, and L7.

According to the relationship between the data state and the adjustment voltage described above, in an optional implementation, the adjustment voltage corresponding to the first group of memory cells is less than the adjustment voltage corresponding to the second group of memory cells; the adjustment voltage corresponding to the second group of memory cells is less than or equal to the adjustment voltage corresponding to the third group of memory cells; and the adjustment voltage corresponding to the third group of memory cells is less than the adjustment voltage corresponding to the fourth group of memory cells.

In one example, the adjustment voltage corresponding to the first group of memory cells may include a negative adjustment voltage; the adjustment voltage corresponding to the second group of memory cells is equal to the adjustment voltage corresponding to the third group of memory cells, and may include a positive adjustment voltage; the adjustment voltage corresponding to the fourth group of memory cells may include a positive adjustment voltage and be greater than the adjustment voltage corresponding to the second group of memory cells and the adjustment voltage corresponding to the third group of memory cells.

In other examples, the N first sub-groups of memory cells include a fifth group, a sixth group and a seventh group; the N second sub-groups of memory cells include an eighth group, a ninth group and a tenth group; the N*N groups of memory cells include 3*3 groups of memory cells; each of the 3*3 groups of memory cells includes one of the fifth group, the sixth group, the seventh group and one of the eighth group, the ninth group and the tenth group;

wherein the threshold voltages of the data states included in the fifth group, the sixth group and the seventh group increase sequentially; and the threshold voltages of the data states included in the eighth group, the ninth group, and the tenth group increase sequentially.

Here, the multiple first data states divide the memory cells coupled to the second word line to include three first sub-groups of memory cells, namely the fifth group, the sixth group, and the seventh group, and the threshold voltages corresponding to the data states corresponding to the fifth group, the sixth group and the seventh group increase sequentially. The multiple second data states divide the memory cells coupled to the second word line to include three second sub-data states, namely the eighth group, the ninth group, and the tenth group, where the threshold voltages corresponding to the data states corresponding to the eighth group, the ninth group, and the tenth group increase sequentially. Therefore, 3*3 groups of memory cells are formed in accordance with the 3 first sub-groups of memory cells and 3 second sub-groups of memory cells; each of the 3*3 groups of memory cells includes one of the fifth group, the sixth group, the seventh group and one of the eighth group, the ninth group and the tenth group.

For example, it is assumed that the first threshold voltage distribution includes eight first data states: L0, L1, L2, L3, L4, L5, L6, and L7, respectively, and their threshold voltages increase sequentially; the second threshold voltage distribution includes eight second data states, which are L0, L1, L2, L3, L4, L5, L6, and L7, respectively, and their threshold voltages increase sequentially. Therefore, the first sub-group of memory cells may include three, e.g., L0, L1, L2 and L3 are a first sub-group of memory cells; L4, L5 and L6 are a first sub-group of memory cells; L7 is a first sub-group of memory cells. In the same way, the second sub-group of memory cells may include three, e.g., L0, L1, L2 and L3 are a second sub-group of memory cells; L4, L5 and L6 are a second sub-group of memory cells; L7 is a second sub-group of memory cells. Based on this, each group of memory cells in the 3*3 groups of memory cells has one of the three first sub-groups of memory cells and one of the three second sub-groups of memory cells.

In one example, the fifth group of memory cells includes the fifth group and the eighth group; the sixth group of memory cells includes the fifth group and the ninth group; the seventh group of memory cells includes the sixth group and the eighth group; the eighth group of memory cells includes the fifth group and the tenth group; the ninth group of memory cells includes the seventh group and the eighth group; the tenth group of memory cells includes the sixth group and the ninth group; The eleventh group of memory cells includes the sixth group and the tenth group; the twelfth group of memory cells includes the seventh group and the ninth group; and the thirteenth group of memory cells includes the seventh group and the tenth group.

In these groups of memory cells, in one example, a way of taking an adjustment voltage may be: the adjustment voltage corresponding to the fifth group of data states may include a negative adjustment voltage; the adjustment voltage corresponding to the sixth and seventh group of data states may include zero; the adjustment voltage corresponding to the eighth, ninth, and tenth groups of memory cells may include a positive adjustment voltage; and the adjustment voltage corresponding to the eleventh, twelfth, and thirteenth groups of memory cells may include a positive adjustment voltage, and is greater than the adjustment voltage corresponding to the eighth, ninth, and tenth groups of memory cells described above.

After determining an adjustment voltage corresponding to each group of memory cells, in some examples, the peripheral circuit may further be configured to: obtain a corresponding second pass voltage in accordance with both of an adjustment voltage corresponding to each group of memory cells and the first pass voltage; and perform the second read operation for multiple times, wherein in the second read operation for each time, a same second read voltage is applied to the second word line; a second pass voltage corresponding to each adjustment voltage is applied to word lines adjacent to the second word line; and a same first pass voltage is applied to other word lines.

According to the previous description, the memory cells coupled to the second word line are grouped in accordance with the threshold voltage distribution of the word lines coupled to the second word line, e.g., divided into 2*2 groups or 3*3 groups, etc., and each group corresponds to one of the aforementioned groups of memory cells, then, the second read operation for multiple times are performed on the memory cells coupled to the second word line, including: a second read operation performed on each group of memory cells of the memory cells coupled to the second word line. Wherein, in the second read operation for each time, the second pass voltage applied to word lines adjacent to the second word line is the sum of the adjustment voltage corresponding to the group of memory cells corresponding to the group of memory cells and the first pass voltage. In other words, the second read operation performed on the memory cells coupled to the second word line includes the second read operation for multiple times, and in the second read operation for each time, the pass voltage of the word lines adjacent to the second word line is adjusted, thereby the threshold voltage distribution of the memory cells coupled to the second word line that is subject to the coupling interference of the adjacent word lines is adjusted to obtain better RWM, i.e., read correction.

For example, it is assumed that the first threshold voltage distribution includes eight first data states: L0, L1, L2, L3, L4, L5, L6, and L7, respectively, and their threshold voltages increase sequentially; the second threshold voltage distribution includes eight second data states, which are L0, L1, L2, L3, L4, L5, L6, and L7, respectively, and their threshold voltages increase sequentially. The formed 2*2 groups of memory cells include: the first group of memory cells including the first group and the third group, i.e., including the first sub-group of memory cells in L0, L1, L2, L3 and L4 and the second sub-group of memory cells in L0, L1, L2, L3 and L4; the second group of memory cells including the first group and the fourth group, i.e., including the first sub-group of memory cells in L0, L1, L2, L3, and L4 and the second sub-group of memory cells in L5, L6, and L7; the third group of memory cells including the second group and the third group, i.e., including the first sub-group of memory cells in L5, L6, and L7 and the second sub-group of memory cells in L0, L1, L2, L3, and L4; the fourth group of memory cells including the second group and the fourth group, i.e., including the first sub-group of memory cells in L5, L6, and L7 and the second sub-group of memory cells in L5, L6, and L7. At this point, the memory cells coupled to the second word line may also form 2*2 groups of memory cells, wherein the 2*2 groups include: Group A, Group B, Group C, and Group D, which correspond to the first group of memory cells, the second group of memory cells, the third group of memory cells and the fourth group of memory cells, respectively. Therefore, performing the second read operation for multiple times includes a total of 4 second read operations: a second read operation to read the memory cells included in group A, a second read operation to read the memory cells included in group B, a second read operation to read the memory cells included in group C, and a second read operation to read the memory cells included in group D. When memory cells included in group A are read, the second pass voltage of the word lines adjacent to the second word line is the sum of the first pass voltage and the adjustment voltage corresponding to the first group of memory cells; when memory cells included in group B are read, the second pass voltage of the word lines adjacent to the second word line is the sum of the first pass voltage and the adjustment voltage corresponding to the second group of memory cells; when memory cells included in group C are read, the second pass voltage of the word lines adjacent to the second word line is the sum of the first pass voltage and the adjustment voltage corresponding to the third group of memory cells; and when memory cells included in group D are read, the second pass voltage of the word lines adjacent to the second word line is the sum of the first pass voltage and the adjustment voltage corresponding to the fourth group of memory cells. According to the previous description, the adjustment voltage corresponding to the second group of memory cells and the adjustment voltage corresponding to the third group of memory cells are the same, and reading the memory cells included in group B and reading the memory cells included in group C may be performed at the same time, i.e., a total of three second read operations may be performed. That is to say, in actual situations, the determined adjustment voltages corresponding to the multiple groups of memory cells may be the same, then, when read operations are being performed, the reads may be merged to reduce the number of read operations and save time.

An example of the present application further provides a method of operating a memory device, wherein the memory device includes a plurality of memory cells and a plurality of word lines coupled to the plurality of memory cells; as shown in FIG. 10, the operating method may include:
 performing a first read operation, wherein the first read operation includes: applying a first read voltage to a first word line in the plurality of word lines that belongs to the first type; and applying a first pass voltage to word lines in the plurality of word lines except the first word line; and
 performing a second read operation, wherein the second read operation includes: applying a second read voltage to a second word line in the plurality of word lines that belongs to the second type; applying a second pass voltage to word lines in the plurality of word lines which are adjacent to the second word line; and applying the first pass voltage to word lines in the plurality of word lines except both of the second word line and the word lines adjacent to the second word line; wherein the second pass voltage is determined in accordance with threshold voltage distributions of the memory cells coupled to the word lines adjacent to the second word line after completion of programming.

In some examples, the second word line belonging to the second type is located between two first word lines belonging to the first type; and before performing the first read operation and the second read operation, the method further includes:
 performing program operations on the plurality of memory cells in a preset programming order;
 wherein, the preset programming order includes: sequentially performing program operations on memory cells coupled to two first word lines belonging to the first type; and performing a program operation on memory cells coupled to a second word line belonging to the second type.

In some examples, the program operation is incremental step pulse programming, and wherein the step size of the incremental voltage corresponding to the programming pulse applied to the first word line belonging to the first type is the same as the step size of the incremental voltage corresponding to the programming pulse applied to the second word line of the second type.

Figure 11:
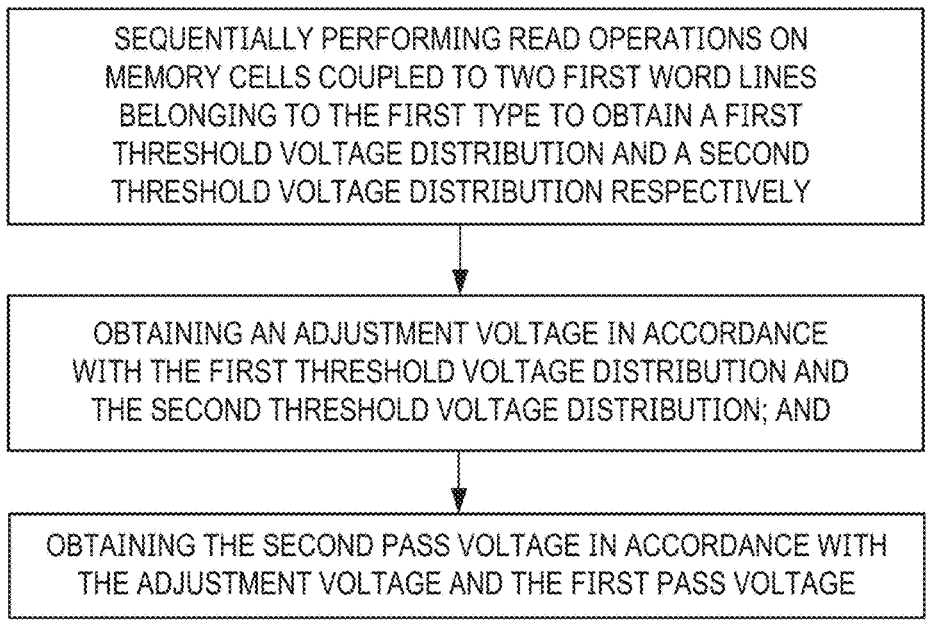
FIG. 11 is a schematic flowchart of a method of operating a memory device provided by an example of the present application.

In some examples, as shown in FIG. 11, the word lines adjacent to the second word line include two first word lines belonging to the first type; and the method further includes:
 sequentially performing read operations on memory cells coupled to two first word lines belonging to the first type to obtain a first threshold voltage distribution and a second threshold voltage distribution respectively;
 obtaining an adjustment voltage in accordance with the first threshold voltage distribution and the second threshold voltage distribution; and
 obtaining the second pass voltage in accordance with the adjustment voltage and the first pass voltage.

Figure 12:
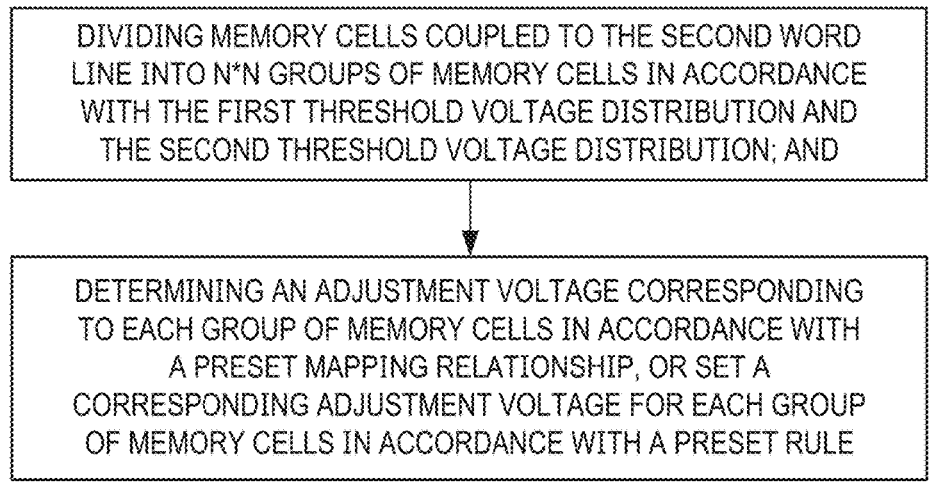
FIG. 12 is a schematic flowchart of a method of operating a memory device provided by an example of the present application.

In some examples, as shown in FIG. 12, the obtaining an adjustment voltage in accordance with the first threshold voltage distribution and the second threshold voltage distribution may include:
 dividing memory cells coupled to the second word line into N*N groups of memory cells in accordance with the first threshold voltage distribution and the second threshold voltage distribution; and
 determining an adjustment voltage corresponding to each group of memory cells in accordance with a preset mapping relationship, or set a corresponding adjustment voltage for each group of memory cells in accordance with a preset rule.

In some examples, the first threshold voltage distribution includes multiple first data states; the second threshold voltage distribution includes multiple second data states; wherein, the memory cells coupled to the second word line are divided into N first sub-groups of memory cells in accordance with the multiple first data states; the memory cells coupled to the second word line are divided into N second sub-groups of memory cells in accordance with the multiple second data states;
 in the case that the N first sub-groups of memory cells include a first group and a second group, and the N second sub-groups of memory cells include a third group and a fourth group, the N*N groups of memory cells include a total of 2*2 groups of memory cells comprising a first group of memory cells, a second group of memory cells, a third group of memory cells and a fourth group of memory cells; wherein, the first group of memory cells includes the first group and the third group; the second group of memory cells includes the first group and the fourth group; the third group of memory cells includes the second group and the third group; the fourth group of memory cells includes the second group and the fourth group; and the threshold voltage in the first threshold voltage distribution corresponding to the first group is less than the threshold voltage in the first threshold voltage distribution corresponding to the second group; and the threshold voltage in the second threshold voltage distribution corresponding to the third group is less than the threshold voltage in the second threshold voltage distribution corresponding to the fourth group.

In some examples, the adjustment voltage corresponding to the first group of memory cells is less than the adjustment voltage corresponding to the second group of memory cells;
 the adjustment voltage corresponding to the second group of memory cells is less than or equal to the adjustment voltage corresponding to the third group of memory cells; and the adjustment voltage corresponding to the third group of memory cells is less than the adjustment voltage corresponding to the fourth group of memory cells.

In some examples, the obtaining the second pass voltage in accordance with the adjustment voltage and the first pass voltage includes:

obtaining a corresponding second pass voltage in accordance with an adjustment voltage corresponding to each group of memory cells and the first pass voltage.

In some examples, the method further includes: sequentially performing the second read operation for multiple times, wherein in the second read operation for each time, a same second read voltage is applied to the second word line; a second pass voltage corresponding to each adjustment voltage is applied to word lines adjacent to the second word line; and a same first pass voltage is applied to other word lines.

In some examples, the method further includes: obtaining a third threshold voltage distribution corresponding to the second read operation for each time; and obtaining a target threshold voltage distribution corresponding to the memory cells coupled to the second word line in accordance with each third threshold voltage distribution, wherein, the target threshold voltage distribution is denser than each third threshold voltage distribution.

The operating method of the memory device provided by the example of the present application is the same as the inventive concept of the previously described memory device. The technical features and terms described in this operating method have been described in detail when describing the memory device previously, and may be understood with reference to the previous description, and may not be repeated here.

An example of the present application provides a memory system, including: the memory device of any one of the aspects described above; and a memory controller coupled to the memory device and controlling the memory device.

In some examples, the memory system may be included in a solid state disk (SSD) or a memory card.

The memory system includes the memory devices described above, therefore, the two have the same technical features, and terms appearing in the memory system are explained in detail in the memory device described above, and are also applicable here, thus may not be repeated here. Only the structure of the memory device most relevant to the technology of the present application is described here, and other structures may be the structures shown in FIGS. 1 to 6 described above, or other memory structures.

The above descriptions is only preferred examples of the present application and is not intended to limit the protection scope of the present application.

What is claimed is:

1. A memory device, comprising:
a memory array including: a plurality of memory cells; and
a plurality of word lines coupled to the plurality of memory cells, the plurality of word lines comprising first type word lines and second type word lines; and
a peripheral circuit coupled to the memory array and configured to:
perform a first read operation, wherein the first read operation includes: applying a first read voltage to a first word line in the first type word lines; and applying a first pass voltage to word lines in the plurality of word lines except the first word line; and perform a second read operation, wherein the second read operation includes: applying a second read voltage to a second word line in the second type word lines; applying a second pass voltage to word lines in the plurality of word lines which are adjacent to the second word line; and applying the first pass voltage to word lines in the plurality of word lines except both of the second word line and the word lines adjacent to the second word line,
wherein the second pass voltage is determined in accordance with threshold voltage distributions of memory cells coupled to the word lines adjacent to the second word line after completion of programming.

2. The memory device of claim 1, wherein the peripheral circuit, before performing the first read operation and the second read operation, is further configured to:
perform program operations on the plurality of memory cells in a preset programming order,
wherein the preset programming order includes: sequentially performing first program operations on memory cells coupled to two of the first type word lines; and performing a second program operation on memory cells coupled to a third word line in the second type word lines, wherein the third word line is located between the two of the first type word lines.

3. The memory device of claim 2, wherein the first program operations and the second program operation are incremental step pulse programming, and wherein a step size of an incremental voltage corresponding to a programming pulse applied in the first program operations is the same as a step size of an incremental voltage corresponding to a programming pulse applied in the second program operation.

4. The memory device of claim 1, wherein the peripheral circuit is further configured to:
sequentially perform read operations on memory cells coupled to two of the first type word lines to obtain a first threshold voltage distribution and a second threshold voltage distribution respectively;
obtain a first adjustment voltage in accordance with the first threshold voltage distribution and the second threshold voltage distribution; and
obtain the second pass voltage in accordance with the adjustment voltage and the first pass voltage.

5. The memory device of claim 4, wherein memory cells coupled to a fourth word line in the second type word lines are divided into N*N groups of memory cells in accordance with the first threshold voltage distribution and the second threshold voltage distribution, and the fourth word line is located between the two of the first type word lines, and wherein the peripheral circuit is further configured to:
determine a second adjustment voltage corresponding to each group of memory cells in accordance with a preset mapping relationship; or set a corresponding adjustment voltage for each group of memory cells in accordance with a preset rule.

6. The memory device of claim 5, wherein the first threshold voltage distribution includes multiple first data states, wherein the second threshold voltage distribution includes multiple second data states, wherein the memory cells coupled to the fourth word line are divided into N first sub-groups of memory cells in accordance with the multiple first data states, wherein the memory cells coupled to the second word line are divided into N second sub-groups of memory cells in accordance with the multiple second data states wherein in the case that in response to the N first sub-groups of memory cells include-including a first group and a second group, wherein and the N second sub-groups of memory cells include a third group and a fourth group, wherein the N*N groups of memory cells include a total of 2*2 groups of memory cells comprising a first group of memory cells, a second group of memory cells, a third group of memory cells and a fourth group of memory cells, wherein the first group of memory cells includes the first group and the third group, wherein the second group of memory cells includes the first group and the fourth group, wherein the third group of memory cells includes the second group and the third group, wherein the fourth group of memory cells includes the second group and the fourth group, wherein and a threshold voltage in the first threshold voltage distribution corresponding to the first group is less than a threshold voltage in the first threshold voltage distribution corresponding to the second group and wherein a threshold voltage in the second threshold voltage distribution corresponding to the third group is less than a threshold voltage in the second threshold voltage distribution corresponding to the fourth group.

7. The memory device of claim 6, wherein:
the adjustment voltage corresponding to the first group of memory cells is less than the adjustment voltage corresponding to the second group of memory cells;
the adjustment voltage corresponding to the second group of memory cells is less than or equal to the adjustment voltage corresponding to the third group of memory cells; and
the adjustment voltage corresponding to the third group of memory cells is less than the adjustment voltage corresponding to the fourth group of memory cells.

8. The memory of claim 5, wherein the peripheral circuit is further configured to:
obtain a corresponding second pass voltage in accordance with an adjustment voltage corresponding to each group of memory cells and the first pass voltage; and
perform the second read operation multiple times, wherein in the second read operation for each time, a same second read voltage is applied to the second word line, wherein the second pass voltage corresponding to each adjustment voltage is applied to word lines adjacent to the second word line, and wherein a same first pass voltage is applied to other word lines.

9. A method of operating a memory device, wherein the memory device includes a plurality of memory cells and a plurality of word lines coupled to the plurality of memory cells, the plurality of word lines comprises first type word lines and second type word lines, and the method comprises:
performing a first read operation, wherein the first read operation includes: applying a first read voltage to a first word line in the first type word lines; and applying a first pass voltage to word lines in the plurality of word lines except the first word line; and
performing a second read operation, wherein the second read operation includes: applying a second read voltage to a second word line in the second type word lines; applying a second pass voltage to word lines in the plurality of word lines which are adjacent to the second word line; and applying the first pass voltage to word lines in the plurality of word lines except both of the second word line and the word lines adjacent to the second word line, wherein the second pass voltage is determined in accordance with threshold voltage distributions of memory cells coupled to the word lines adjacent to the second word line after completion of programming.

10. The method of claim 9, wherein before performing the first read operation and the second read operation, the method further includes:
performing program operations on the plurality of memory cells in a preset programming order
wherein the preset programming order includes: sequentially performing first program operations on memory cells coupled two of the first type word lines; and performing a second program operation on memory cells coupled to a third word line in the second type word lines, wherein the third word line is located between the two of the first type word lines.

11. The method of claim 10, wherein the first program operations and the second program operation are incremental step pulse programming, and wherein a step size of an incremental voltage corresponding to a programming pulse applied in the first operations is the same as a step size of an incremental voltage corresponding to a programming pulse applied in the second program operation.

12. The method of claim 9, wherein the method further includes:
sequentially performing read operations on memory cells coupled to two of the first type word lines to obtain a first threshold voltage distribution and a second threshold voltage distribution respectively;
obtaining a first adjustment voltage in accordance with the first threshold voltage distribution and the second threshold voltage distribution; and
obtaining the second pass voltage in accordance with the adjustment voltage and the first pass voltage.

13. The method of claim 12, wherein obtaining the adjustment voltage in accordance with the first threshold voltage distribution and the second threshold voltage distribution includes:
dividing memory cells coupled to a fourth word line in the second type word lines into N*N groups of memory cells in accordance with the first threshold voltage distribution and the second threshold voltage distribution, wherein the fourth word line is located between the two of the first type word lines; and
either
determining a second adjustment voltage corresponding to each group of memory cells in accordance with a preset mapping relationship; or set a corresponding adjustment voltage for each group of memory cells in accordance with a preset rule.

14. The method of claim 13, wherein the first threshold voltage distribution includes multiple first data states, wherein the second threshold voltage distribution includes multiple second data states, wherein the memory cells coupled to the fourth word line are divided into N first sub-groups of memory cells in accordance with the multiple first data states, wherein the memory cells coupled to the second word line are divided into N second sub-groups of memory cells in accordance with the multiple second data states wherein in the case that in response to the N first sub-groups of memory cells include-including a first group and a second group, wherein and the N second sub-groups of memory cells include a third group and a fourth group, wherein the N*N groups of memory cells include a total of 2*2 groups of memory cells comprising a first group of memory cells, a second group of memory cells, a third group of memory cells and a fourth group of memory cells, wherein the first group of memory cells includes the first group and the third group, wherein the second group of memory cells includes the first group and the fourth group, wherein the third group of memory cells includes the second group and the third group, wherein the fourth group of memory cells includes the second group and the fourth group, wherein and a threshold voltage in the first threshold voltage distribution corresponding to the first group is less than a threshold voltage in the first threshold voltage distribution corresponding to the second group, and wherein a threshold voltage in the second threshold voltage distribution corresponding to the third group is less than a threshold voltage in the second threshold voltage distribution corresponding to the fourth group.

15. The method of claim 14, wherein:
- the adjustment voltage corresponding to the first group of memory cells is less than the adjustment voltage corresponding to the second group of memory cells;
- the adjustment voltage corresponding to the second group of memory cells is less than or equal to the adjustment voltage corresponding to the third group of memory cells; and
- the adjustment voltage corresponding to the third group of memory cells is less than the adjustment voltage corresponding to the fourth group of memory cells.

16. The method of claim 13, wherein the obtaining the second pass voltage in accordance with the adjustment voltage and the first pass voltage includes:
- obtaining a corresponding second pass voltage in accordance with an adjustment voltage corresponding to each group of memory cells and the first pass voltage.

17. The method of claim 16, further includes:
- sequentially performing the second read operation multiple times, wherein in the second read operation for each time, a same second read voltage is applied to the second word line, wherein the second pass voltage corresponding to each adjustment voltage is applied to word lines adjacent to the second word line, and wherein a same first pass voltage is applied to other word lines.

18. The method of claim 17, further including:
- obtaining a third threshold voltage distribution corresponding to the second read operation for each time; and
- obtaining a target threshold voltage distribution corresponding to the memory cells coupled to the second word line in accordance with each third threshold voltage distribution,
- wherein the target threshold voltage distribution is denser than each third threshold voltage distribution.

19. A memory system, comprising:
a memory device, including:
- a memory array including a plurality of memory cells and a plurality of word lines coupled to the plurality of memory cells, the plurality of word lines comprising first type word lines and second type word lines;
- a peripheral circuit coupled to the memory array and configured to:
  - perform a first read operation, wherein the first read operation includes: applying a first read voltage to a first word line in the first type word lines; and applying a first pass voltage to word lines in the plurality of word lines except the first word line; and
  - perform a second read operation, wherein the second read operation includes: applying a second read voltage to a second word line in the second type word lines; applying a second pass voltage to word lines in the plurality of word lines which are adjacent to the second word line; and applying the first pass voltage to word lines in the plurality of word lines except both of the second word line and the word lines adjacent to the second word line, wherein the second pass voltage is determined in accordance with threshold voltage distributions of memory cells coupled to the word lines adjacent to the second word line after completion of programming; and
a memory controller coupled to the memory device and configured to control the memory device.

20. The memory system of claim 19, wherein the memory system comprises a solid state drive (SSD) or a memory card.

* * * * *